United States Patent
Atsumi et al.

(10) Patent No.: US 6,729,954 B2
(45) Date of Patent: May 4, 2004

(54) BATTLE METHOD WITH ATTACK POWER BASED ON CHARACTER GROUP DENSITY

(75) Inventors: Takashi Atsumi, Yokohama (JP); Tomokazu Takeda, Setagaya-ku (JP)

(73) Assignee: Koei Co., Ltd., Yokohama (JP)

(*) Notice: Subject to any disclaimer, the term of this patent is extended or adjusted under 35 U.S.C. 154(b) by 71 days.

(21) Appl. No.: 09/929,967

(22) Filed: Aug. 15, 2001

(65) Prior Publication Data

US 2002/0045470 A1 Apr. 18, 2002

(30) Foreign Application Priority Data

Aug. 29, 2000 (JP) ........................................ 2000-258392

(51) Int. Cl.[7] .............................................. G06F 17/00
(52) U.S. Cl. ....................... 463/7; 463/1; 463/8; 434/11
(58) Field of Search ........................ 463/7–8, 1, 30–33, 463/43–44; 434/11

(56) References Cited

U.S. PATENT DOCUMENTS

| | | | | |
|---|---|---|---|---|
| 5,292,254 | A | * | 3/1994 | Miller et al. .................. 434/11 |
| RE35,314 | E | * | 8/1996 | Logg .............................. 463/2 |
| 5,941,708 | A | * | 8/1999 | FitzGerald .................... 434/16 |
| 6,024,643 | A | * | 2/2000 | Begis ........................... 463/42 |
| 6,179,713 | B1 | * | 1/2001 | James et al. .................. 463/42 |
| 6,210,273 | B1 | * | 4/2001 | Matsuno ........................ 463/8 |
| 6,254,394 | B1 | * | 7/2001 | Draper et al. ................. 434/11 |
| 6,267,674 | B1 | * | 7/2001 | Kondo et al. ................. 463/32 |
| 6,273,818 | B1 | * | 8/2001 | Komoto ....................... 463/31 |
| 6,273,822 | B1 | * | 8/2001 | Tanaka ........................ 463/43 |
| 6,347,994 | B1 | * | 2/2002 | Yoshikawa et al. ............ 463/7 |
| 6,419,577 | B1 | * | 7/2002 | Okada et al. .................. 463/1 |
| 6,454,653 | B1 | * | 9/2002 | Kawazu ........................ 463/43 |
| RE37,948 | E | * | 12/2002 | Sakaguchi et al. ............ 463/43 |
| 6,488,582 | B1 | * | 12/2002 | Suzuki ......................... 463/31 |
| 6,623,010 | B1 | * | 9/2003 | Holland, Jr. ................. 273/292 |

FOREIGN PATENT DOCUMENTS

| | | |
|---|---|---|
| JP | 8-63613 | 3/1996 |
| JP | 08-063613 | * 3/1996 ............ G06T/13/00 |
| JP | 2000-167238 | * 6/2000 ............ A63F/13/00 |

OTHER PUBLICATIONS

Strategy Review, Risk II, Recreating A Classic. May 2000: http://www.cdmag.com/articles/028/044/risk2_review.html.*

Butts, Stephen: Risk II: Hasbro adds some new twists to the standard board game. Oct. 1999: http://pc.ign.com/articles/133/133205p1.html.*

Butts, Stephen: Risk II: While it's still just Risk, it's also a whole lot more. Mar. 2000: http://pc.ign.com/articles/163/163205p1.html.*

Mindscape Company: Wargame Construction Set III: Age of Riffles 1846–1905 User Manual. 1996.*

Gauntlet, Mindscape Inc. circa 1987, Users Manual.*

Dungeons and Dragons FAQ: Users Manual Paizo Publishing, circa 2002.*

Ultima Online Playguide, Users Manual, circa 1999.*

Quake II Capture the Flag User Manual, id Software: circa 1998, http://www.captured.com/q2ctf/.*

Diablo II: Blizzard Entertainment, circa 2003, http://www.blizzard.com/diablo2.*

* cited by examiner

*Primary Examiner*—Michael O'Neill
*Assistant Examiner*—Christina Marks
(74) *Attorney, Agent, or Firm*—Wean Khing Wong

(57) ABSTRACT

A character group battle method which can express uneven distribution of attack power, defense strength or the like that is unevenly distributed in a group comprising a plurality of characters is provided. Within a predetermined time period, the position of each character in a 3-dimensional virtual space is calculated, the character number of other friend characters existing in a predetermined region about the character is calculated (S304), an attack value and a defense value expressing the attack power and the defense strength of the character are calculated on the basis of the character number (S310, S312), and a color correction value is calculated for changing color tone of the character according to the attack value (defense value) (S314).

20 Claims, 24 Drawing Sheets

| OBJECT SOLDIERS | SOLDIERS OTHER THAN OBJECT SOLDIER |
|---|---|
| F1 | F2, F3, —, —, —, F100 |
| —, —, —, F10, —, —, — | F1, —, —, F9, F11, —, F100 |
| —, —, F100 | F1, F2, —, —, —, F99 |
FIG.26
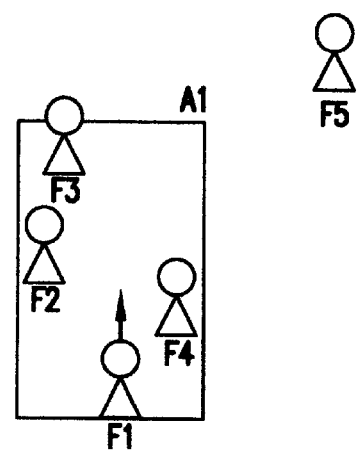
FIG.27A
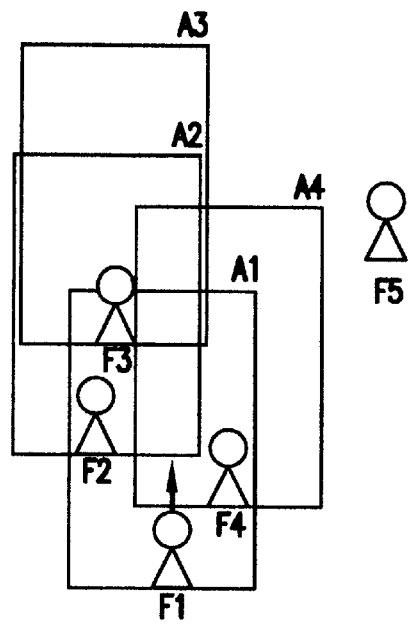
FIG.27B

BATTLE METHOD WITH ATTACK POWER BASED ON CHARACTER GROUP DENSITY

This application is based upon and claims the priority (under 35 USC §119, under the Paris Convention) of a Japanese patent application, serial number 2000-258392, entitled "Character Group Battle Method, Recording Medium, and Game Device", of Atsumi et al., filed on Aug. 29, 2000, the disclosure of which is hereby expressly incorporated by reference in its entirety.

FIELD OF THE INVENTION

This invention relates to a character group battle method, as well as to a recording medium and a game device, and more particularly to a character group battle method in which a plurality of characters, that are displayed in a 3-dimensional virtual space form groups of friends and enemies that battle against one another, as well as to a computer readable recording medium on which the method has been recorded and a game device in which a game program for executing the method is loaded.

DESCRIPTION OF THE RELATED ART

Recently, there are various kinds of game software sold by various companies that are recorded on a recording medium such as CD-ROM. This kind of recording medium is used by inserting it into a game device. The most typical kind of home-use game device comprises an input device, such as a controller pad, and a TV monitor which are connected to a main game unit. When a player or a user inserts a recording medium into the main game unit, a game program that has been recorded on the recording medium is loaded to a RAM of the main game unit automatically, and a game starts by pressing a certain button on the input device. Then, it is possible to play the game by operating buttons on the input device.

Conventionally, battle games in which characters are mainly divided up into friend and enemy using 2-dimensional coordinates have been sold. For example, there is a game, 'Bokosuka Wars', sold by Ascii Co. in 1985 for a family computer (Nintendo Co.), where a player's rank rises each time a friend soldier wins a battle, or a game, 'Napoleon's Journal', sold by Irem Co. in 1988, in which a player selects a direction for each unit to move in, then when a friend unit encounters an enemy, the player selects an army formation from among some selectable army formations. Also, there are games such as a game, 'Silver Ghost', that was sold by Kure Software Co. in 1988 for a computer (for NEC, PC-88X1), in which a player controls characters and helps a character directly when caught in a pinch.

For game software like these, the game does not wait for a command input by the player during a battle, but the game continues on and battles are repeated in real-time even when a command is being input. These kinds of games are called 'Real-time Simulation Games'. Real-time simulation games belong to the genre of games in which the enemy army is attacked and defeated while considering tactics. They differ from 'Turn-format' game in which a command input from the player is received after a predetermined time elapsed, and in which the enemy does not attack during a command input. In real-time simulation games, the enemy constantly attacks, so it is possible to experience the tension and tactics of a real battle.

On the other hand, as a conventional game regarding a group movement, one where a plurality of (5 or so) characters move on coordinates represented in 2-dimenional manner while forming a group line has been sold. For example, in Japanese Patent Application Laid-Open No. 08-63613 (JP-A), a technique where moving speed and timing/probability of a change of direction is set for each character in advance, and an aspect where the character follows a main character which is a leader of the group line is represented with an individual change has been disclosed. Also, in Japanese Patent Application No. 11-233595 (U.S. patent application Ser. No. 09/623,745) of the present applicant, an invention regarding a group character moving method where a plurality of characters, that are displayed in a 3-dimensional virtual space, having a leader form a group to move to a target point which is set in advance has been described. According to this invention, since the positions and accelerations of the plurality of characters belonging to the group are computed for each character and an acceleration for separating from another friend character by a predetermined distance, an acceleration for matching with a moving speed or a moving direction of another friend character or the like are computed so that the respective characters change the speeds or directions according to the moving states of the friend characters, action of each character can be expressed realistically in imitation of a group movement of animals or the like.

Further, as a technique regarding the group battle, in Japanese Patent Application No. 11-339176 (U.S. patent application Ser. No. 09/721,886) of the present applicant, an invention regarding a group character battle method in which a plurality of characters that are displayed in a 3-dimensional virtual space forms groups of friends and enemies that battle against one another has been described. According to this invention, each character belonging to the group finds (searches for) an enemy character within its own range of vision and approaches the enemy character to start a battle, it is possible to realistically express a battle aspect where each character battles an enemy character according to its own judgement.

However, in conventional real-time simulation games, since the game is mainly a 2-dimenisional battle, it is not possible to express the power of an actual battle, and there was a need for better visibility. Also, with the rapid advance of current computer technology, it is possible to display images on the screen of the TV monitor that are equal to that of movies, however, with the conventional technology there was the problem that games did not have the realistic feeling that players desire.

Moreover, in the real-time simulation games described above or the technique of the JP-A 08-63613, there are described only thinking-type games in which strategy is enjoyed, such as games in which, when a player moves a leader on step forward, other characters follow by one step, and when a friend character comes in contact with an obstacle on the way, it becomes impossible for that character to advance, or games in which characters do not search out an enemy automatically, but when a character comes in contact with an enemy along the way, a battle begins. Also, there are games of such a type that a player determines an advancing direction of each group; when a friend unit or group encounters an enemy unit, a screen is switched to a formation selection screen; and when the player selects one formation from among a plurality of predetermined formations, the screen is switched to a battle screen in which characters of a friend unit battle with characters of an enemy unit. However, these games are only thinking-type ones like the above, because the characters are not processed internally and specifically for each character. Accordingly, there is a problem in which there is no feeling of an actual battle in which each character would move while keeping a constant distance from friends about him/her, each character would search out an enemy on his/her own, or the state of enemy search movement would change depending on conditions.

Regarding this point, in the inventions of Japanese Patent Application Nos. 11-233595 and 11-339176, since characters are internally processed specially for each character, movement action or battle action of each character in the unit or group can be expressed more realistically, but no attention is paid to an offensive (attack) power of a group, a defense strength thereof, or the like.

Generally, it is said that in case of a foot soldier, a break-through power is increased according to increase in the number of foot soldiers overlapping before and behind and a defense strength is enhanced according to decrease in space between adjacent soldiers, and in case of a bow soldier, an attack power is increased according to the degree of transverse development of bow soldiers to enemies rather than a longitudinal development thereof. Accordingly, for example, when several hundreds of characters (soldiers) are handled as a group, strong points and weak points regarding an attack power, a defense strength or the like occur unevenly in a friend group (friend unit) according to the position or situation of the friend group to an enemy group and kinds of army (foot soldier unit, properties of characters of a bow soldier unit or the like). However, in the conventional group battle games, parameters such as an attack power, a defense strength and the like of the entire friend group are uniformly corrected according to the affinity of a friend group to an enemy group or the like. That is to say, application of an attack power, a defense strength, or the like is directed to a friend group in the mass, but an attack power or a defense strength is not set to respective characters constituting the friend group. Even if such a parameter is set to respective characters, the set value is uniform. For this reason, in the conventional group battle games, uneven distribution of strong and weak points in group constituting soldiers of the same kind (variations in strength such as a partial attaching power, defense strength or the like of an army unit) cannot be expressed, and for expressing such an uneven distribution, the army unit must be constituted by mixing soldiers of different kinds having different attack power, defense strength or the like. However, there is not any consideration of expressing strong and weak points by the density (degree of crowding) of soldiers in the conventional games, and it is thought difficult from some aspects that a player enjoys the conventional games in a truly tactical manner.

SUMMARY OF THE INVENTION

In consideration of the problems described above, an object of this invention is to provide a character group battle method where uneven distribution of an attack power, a defense strength or the like can be expressed regarding a group comprising a plurality of characters, a program, recording medium and a game device.

In order to achieve the above problem, according to a first aspect of the present invention, there is provided a character group battle method in which a plurality of characters, that are displayed in a 3-dimensional virtual space, form groups of friends and enemies that battle against one another, wherein an attack value or level and/or a defense value or level expressing an attack power and/or a defense strength of the character is calculated on the basis of the density of a group comprising the character and other friend characters in the vicinity thereof.

In this aspect, since for each character, the attack value and/or the defense strength of the character is calculated on the basis of the density of the group comprising the character and other characters present in the vicinity of the character, in a case that the degree of crowding is high and many other characters exist in the vicinity of the character, the attaching power and/or the defense strength of the character is made large. According to this aspect, since the attack power and/or the defense strength is calculated for each character constituting the group, the uneven distribution of strong and weak points of the attack power and/or the defense strength of the entire group can be expressed. Regarding such a density, for example, even when High or Low about the character may be calculated for each region with arbitrary size in the 3-dimensional virtual space, or High or Low about a region with an arbitrary size in the 3-dimensional virtual space may be calculated for each character.

An embodiment of this aspect can be configured so as to include the steps of calculating the position of a character in a 3-dimensional virtual space, calculating the character number of other friend characters existing within a predetermined region about the character, and calculating an attack value (or level) and/or a defense value (or level) expressing an attack power and/or a defense strength of the character on the basis of the character number; or the steps of calculating the positions of characters in a 3-dimensional virtual space, when other friend characters exist within a predetermined region about one character of the characters, accumulating, as the one character capable of supporting the other characters, the character number of the supportable characters for each character, and calculating an attack value and/or a defense value expressing an attack power and/or a defense strength of character on the basis of the accumulated character number. In this case, when the line-up position of the characters is calculated on the basis of the army formation of the group selected by a player or a computer, the attack power and/or the defense strength of each character forming the army formation at the line-up position of the selected group, so that the uneven distribution of strong and weak points about the attack power and/or the defense strength of the army formation at the line-up position of the group can be expressed. Further, when the army formation during a group movement of the group is maintained in a similar shape to the army formation of the group in the line-up position of characters, the uneven distribution of strong and weak points of the attack power and/or the defense strength can be expressed while maintaining the army formation of the similar shape to the army formation at the line-up position during the group movement.

Also, when the predetermined region is selected from a region group defined in advance by personality of a character, the predetermined region is selected according to the personality of a character so that the region where the character number is counted or accumulated, which is a base for an attack value and/or defense value calculation such as when the number of foot soldiers overlapping along front and rear directions is increased the attack power or the like is increased or when the length of development of bow soldiers is increased the attack power or the like is increased can be adapted to the personality of a character. Further, when the character number exceeds a predetermined maximum value, it is restricted to the maximum value, so that the attack value and/or defense value can be prevented from being increased infinitely. Therefore, the limitation of the attack power and/or the defense strength of a character can be expressed in imitation of that (those) of human.

In the above aspect, when a step for calculating a change value for changing the display of the character in the 3-dimensional virtual space on the basis of the attack value and/or defense strength calculated is further included, the display of the character can be changed by the change value according to the magnitude of the attack value and/or defense value so that a player can recognize or understand the unevenness distribution of the attack power and/or defense strength of the group immediately by viewing the display in the 3-dimensional virtual space.

Also, in order to accomplish the above object, a second aspect of the present invention is a computer executable program which can execute the character-group battle method of the above first aspect, a third aspect thereof is a computer readable recording medium on which the program of the second aspect has been recorded, and a fourth aspect thereof is a game device where a character-group battle program in which a plurality of characters, that are displayed in a 3-dimensional virtual space, form groups of friends and enemies that battle against one another can be stored in a storing section, comprising a position calculator for calculating the position of the character in the 3-dimensinal virtual space; a character number calculator for calculating the character number of other characters existing in a predetermined region about the character; and an attack value and/or defense value calculator for calculating an attack value and/or a defense value expressing the attack power and/or a defense strength of the character, or comprising a position calculator for calculating the positions of the characters in the 3-dimensional virtual space; an accumulator for, when other friend characters exist within a predetermined range about one character of the characters, accumulating, as the one character capable of supporting the other characters, the character number of the supportable characters for each character; and an attack value and/or defense value calculator for calculating an attack value and/or a defense value expressing an attack power and/or a defense strength of character on the basis of the character number accumulated by the accumulator.

BRIEF DESCRIPTION OF THE DRAWINGS

FIG. 26 is an explanatory diagram for explaining process procedure of soldiers to be processed of steps 302 to 306 of army formation strength calculating sub-routine of the second embodiment and soldiers expect for the soldiers to be processed; and FIGS. 27A and 27B are explanatory diagrams for explaining calculation contents of steps 302 to 312 of the army formation strength calculation sub-routine of the second embodiment, FIG. 27A showing the concept of calculation in steps 306 to 312 and FIG. 27B showing the concept of calculation over the entire of steps 302 to 312.

EMBODIMENTS OF THE INVENTION (First Embodiment)

A first embodiment where the present invention has been applied to a home-use video game device will be explained below with reference to the drawings.

(Configuration)

Figure 1:
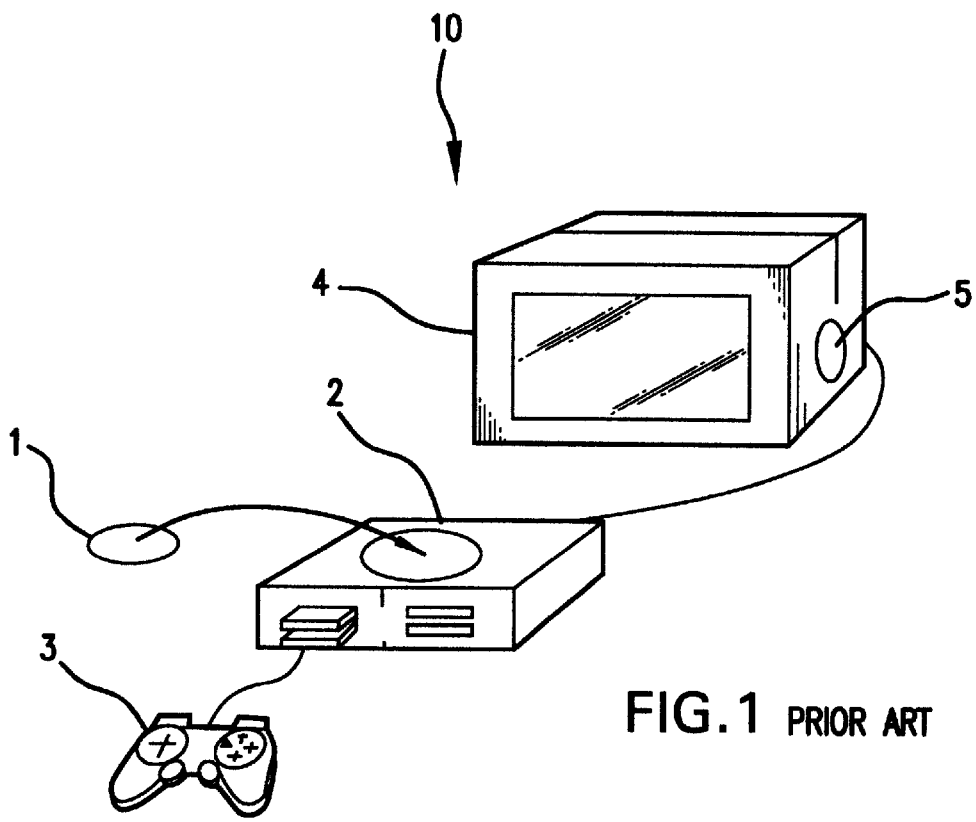
FIG. 1 is a simplified perspective view showing a setup of a home-use game device.

As shown in FIG. 1, a home-use video game device 10 of this embodiment comprises a game device main body 2, and a television (TV) monitor 4 with a speaker 5 and an input device 3 which are connected thereto. The game device main body 2 is provided with a medium reading section (refer to FIG. 3) in which a recording medium 1 such as CD-ROM or the like can be loaded. By loading a recording medium in this medium reading section, a game program or game data recorded on the recording medium 1 is automatically loaded in a storage memory within the game device main body 2.

Figure 2:
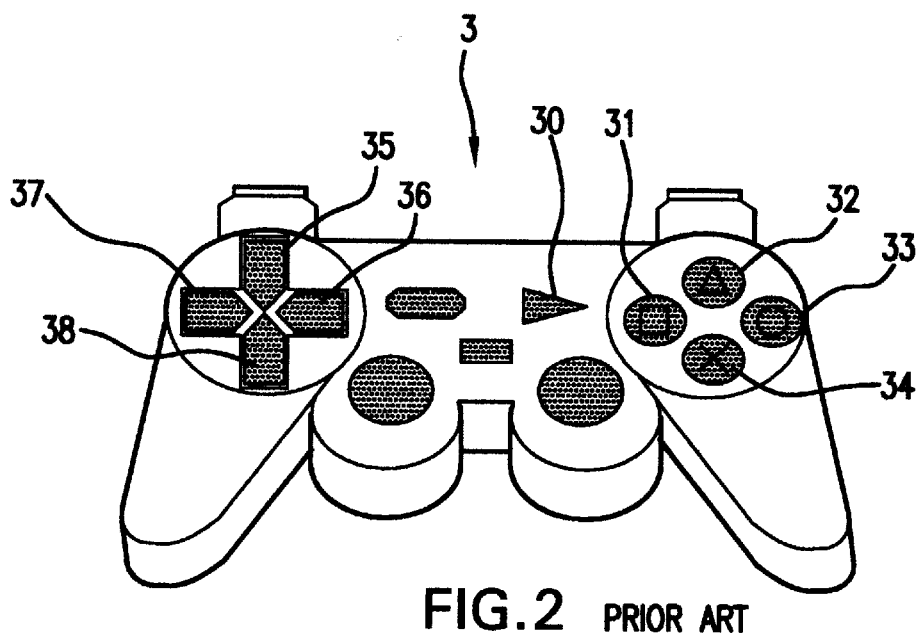
FIG. 2 is a plan view of an input device that is used with the home-use game device.

As shown in FIG. 2, arranged on the input device 3 are various buttons, such as a start button 30 for starting such a game as a group battle game or the like, a set of a □ button 31, a Δ button 32, a ○ button 33, a × button 34 for operating a character and/or responding to a selection inquiry from the game device main body 2, and a cross direction button set comprising a ↑ button 35, a → button 36, a ← button 37 and a ↓ button 38, and the like.

Figure 3:
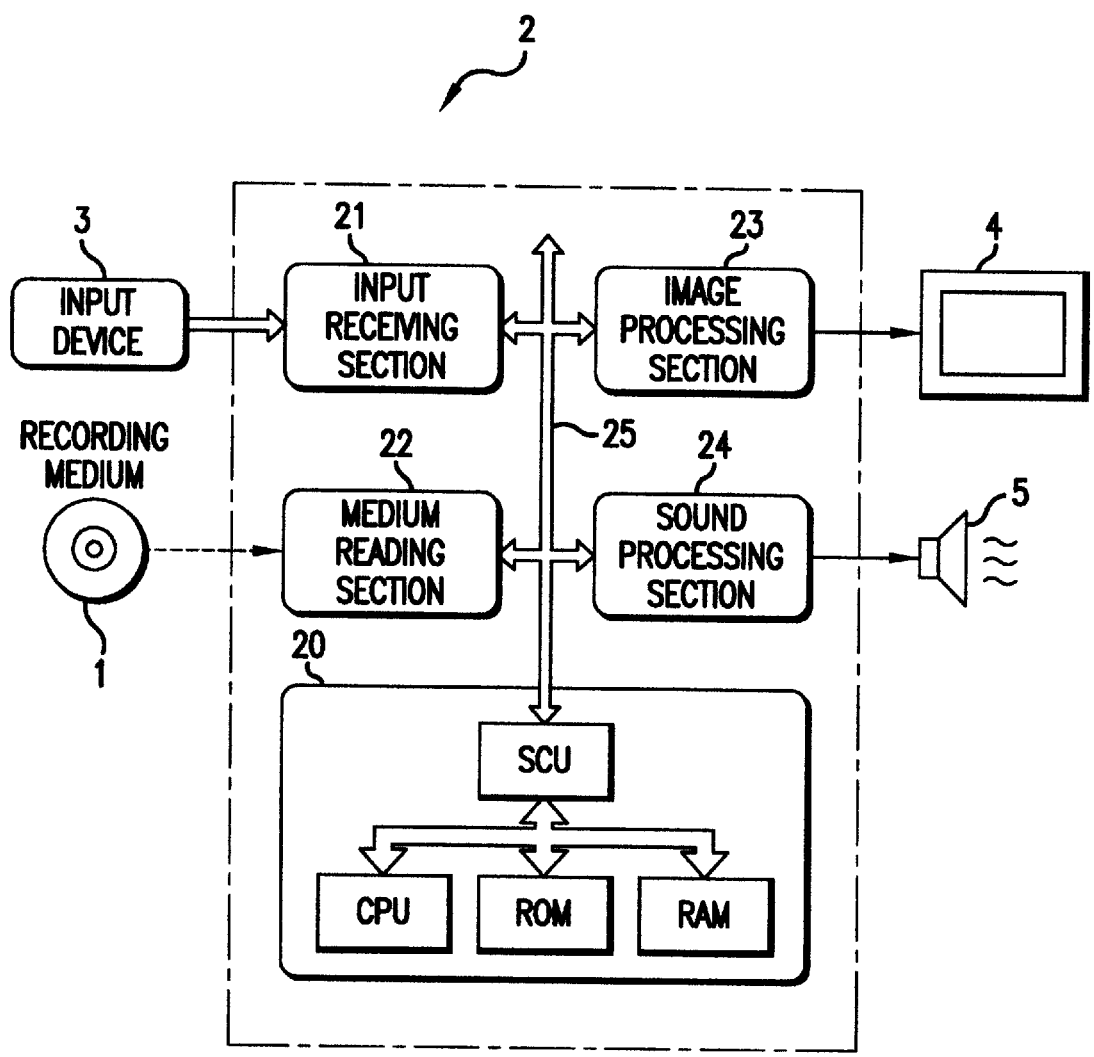
FIG. 3 is a simplified block diagram showing a configuration of a game device main body of an embodiment to which the present invention is applied.

As shown in FIG. 3, the game device main body 2 is provided with a CPU block 20 for performing control on the entire device, which serves as a position calculator, a character number calculator, an accumulator, an attack value (level)/defense value (level) calculator and a change value (level) calculator. The CPU block 20 comprises a SCU (System Control Unit) for mainly controlling data transfer between respective sections within the game device main body 2, a CPU operating as a central processing unit at a high-speed clock, a ROM in which basic control operations for the game device main body 2 have been stored, a RAM which works as an working area of the CPU and which temporarily stores game programs and various data which have been recorded in the recording medium 1, and an internal bus connecting these unit.

An external bus 25 is connected to the SCU. The external bus 25 is connected to an input receiving section or unit 21 which receives input from the input device 3 such as a controller pad or the like and transfers the input information or data to the CPU block 20, a medium reading section 22, such as a CD-ROM drive, which comprises a sub-CPU (not shown) and which reads game programs which have been recorded on the recording medium 1 to transfer it to the CPU block 20, an image processing section 23 which comprises a sub-CPU and a VRAM (not shown) and which produces an image according to the data transferred from the CPU block 20, and an audio processing section 24 which comprises a sub-CPU (not shown) and which processes sound such as background music, or galloping sounds of horse soldiers, etc. In addition, the input receiving section 21 is connected to the input device 3, the image processing section 23 is connected to the TV monitor 4, and the audio processing section 24 is connected to the speaker 5 inside the TV monitor 4.

(Operation)

Next, the operation of the home-use video game device 10 of this embodiment will be explained with reference to the flowcharts of a case where a soldier (serving as a character) belonging to a player's army (hereinafter, referred to as F army) and a soldier belonging to an army (hereinafter, referred to as E army) of a computer side (CPU block 20) battle against each other. It is to be noted that the recording medium 1 has been loaded in the game device main body 1 and the game program and game data have been stored in RAM in the CPU block 20 so that an initial setting has been completed. Also, for simplicity of explanation, in the following flowchart, the actions of the player's army F will mainly be explained, and the explanation about the computer's army E will be omitted because the similar process is executed regarding the computer's army E.

[Attack Power (Defense Strength) of Line-up State]

Figure 4A:
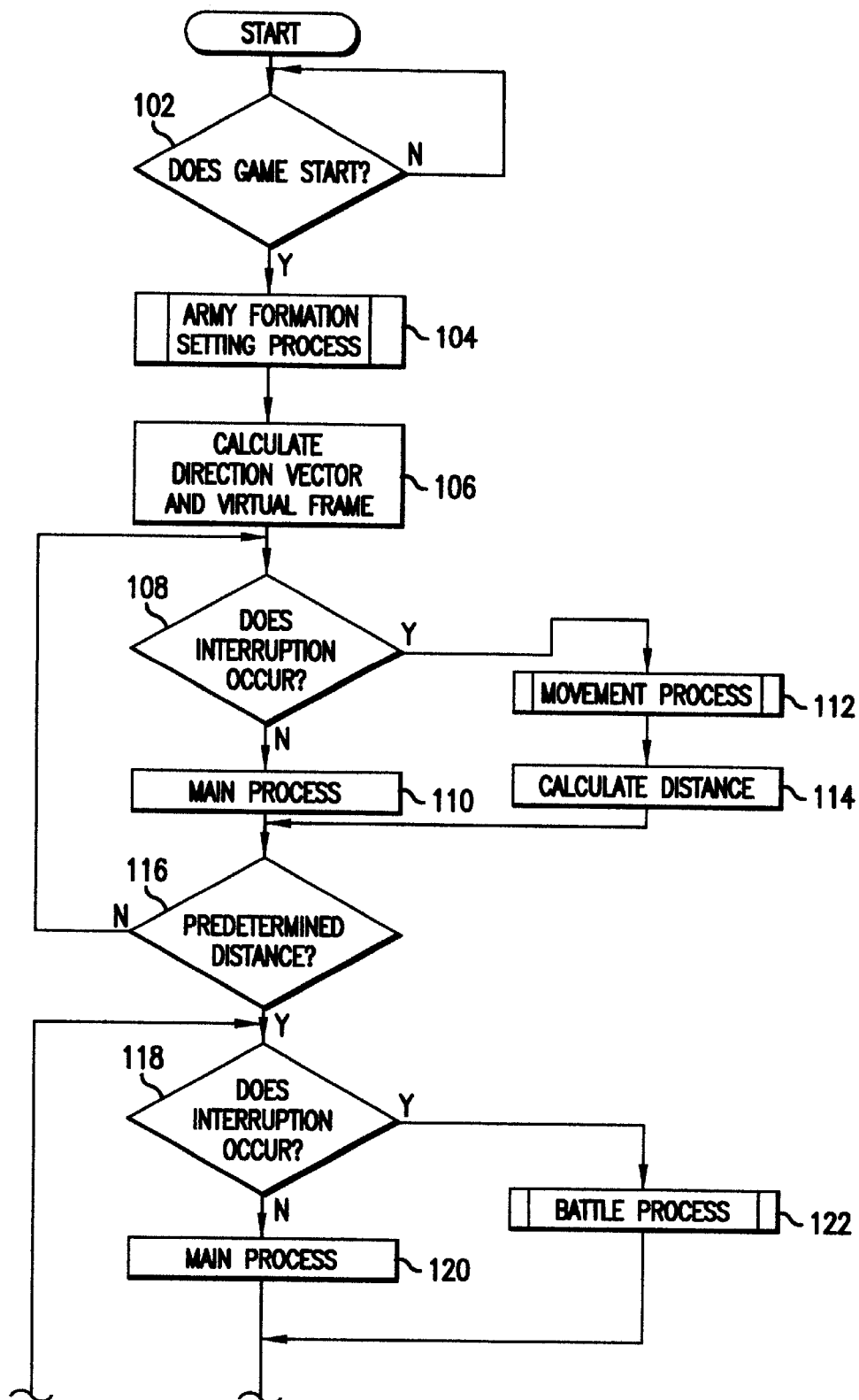
FIGS. 4A to 4B is a flowchart showing a battle routine of an embodiment of the invention.
Figure 4B:
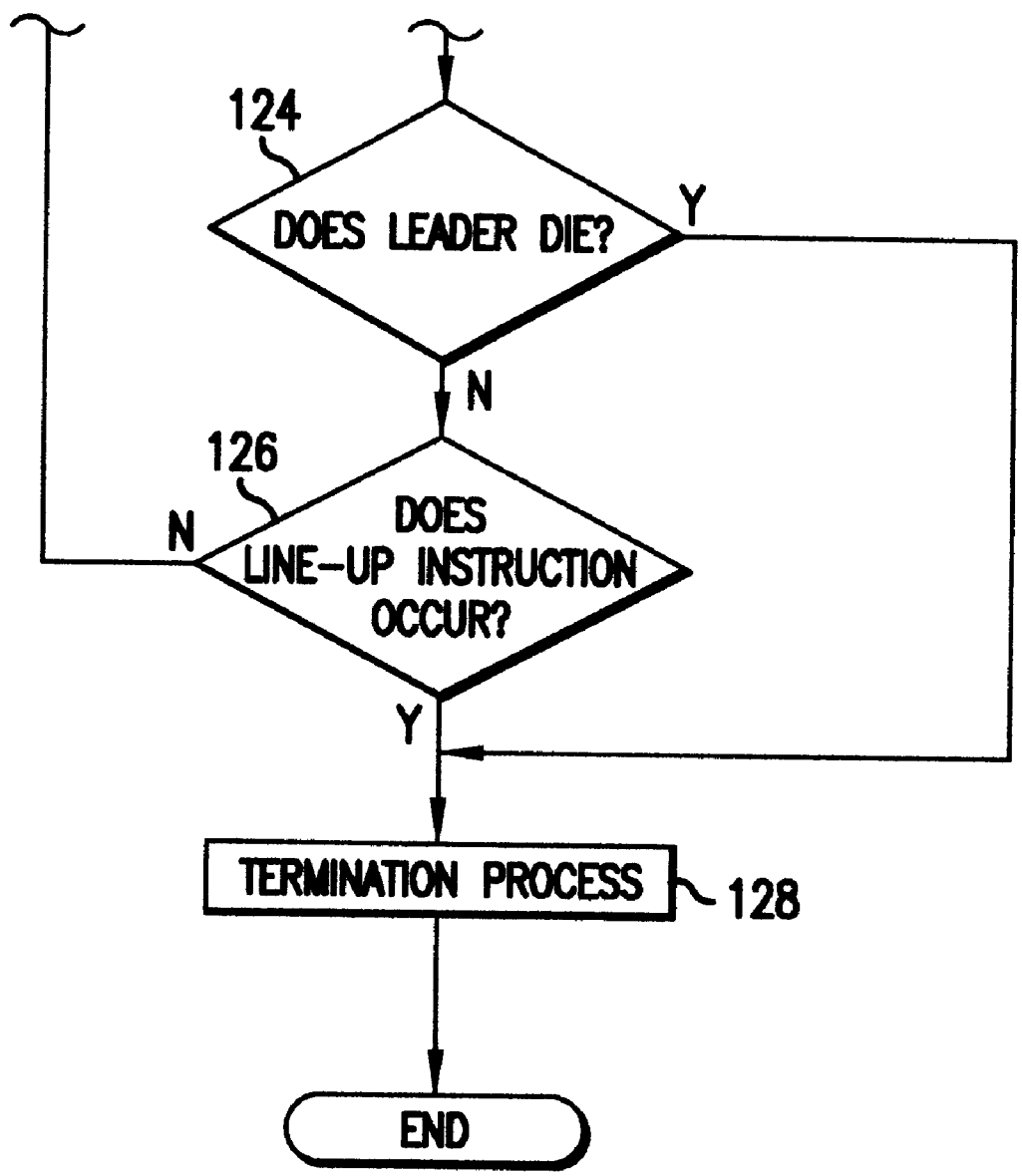

As shown in FIGS. 4A through 4B, the CPU in the CPU block 20 executes a battle routine where respective soldiers belonging to the army F and the army E are caused to battle against one another. In this battle routine, first, in step 102, the process waits until the start button 30 shown in FIG. 2 is pressed. When a judgement in step 102 is affirmative, in the next step 104, a formation setting process sub-routine for setting a formation (army unit formation) of the army F (and army E) is executed.

Figure 5:
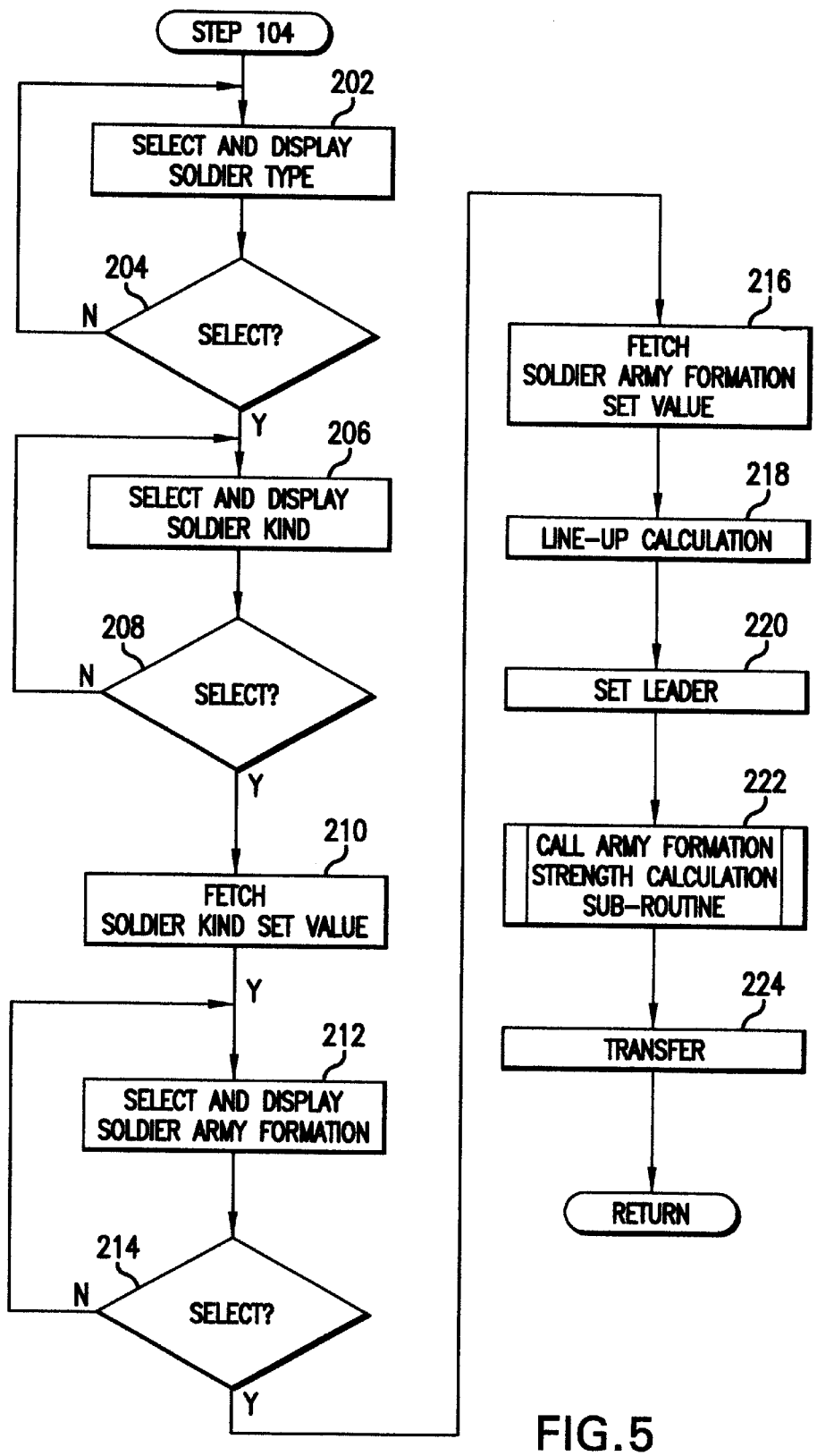
FIG. 5 is a flowchart of a formation setting process sub-routine showing the detail of step 104 of the battle routine.

As shown in FIG. 5, in this formation setting process sub-routine, as shown in Table 1, in step 202, in order to cause the player to select one of three soldier corpses of a foot soldier type, a bow soldier type and a horse soldier type, a soldier corps selection display for displaying icons including these soldier corps names on the TV monitor 4 is performed, and the process waits until selection is made by the player in the next step 204.

TABLE 1

| SOLDIER CORPS | SOLDIER KIND | SUPPORT REGION a × b (m²) | MAXIMUM VALUE OF NUMBER N OF SUPPORT SOLDIERS |
|---|---|---|---|
| FOOT SOLDIER TYPE | FOOT SOLDIER SPEARMAN | 8 m × 8 m | 15 |
| BOW SOLDIER TYPE | SHORT-RANGE BOW SOLDIER LARGE BOW SOLDIER | 20 m × 2 m | 15 |
| HORSE SOLDIER TYPE | LIGHT CAVALRYMAN LANCER HUNTING HORSE SOLDIER ELEPHANT SOLDIER | 16 m × 16 m | 7 |

When the player selects any one of the corpses mentioned above, in step 206, soldier kind selection display is performed such that icons of soldier kinds corresponding to the selected corps, i.e., icons of soldier kinds corresponding to the selected corps i.e., as shown in Table 1, icons of a foot soldier and a spearman when the player selects the food soldier type, icons of a short-range bow soldier and a large bow soldier when he/she selects the bow soldier type, and icons of a light cavalryman, a lancer, a hunting horse soldier, and an elephant soldier when he/she selects the horse soldier type, are displayed and one icon is selected from these icons by the player, and the process waits until the player selects one icon in the next step 208. When the player selects one soldier kind or icon, a default value corresponding to the selected soldier kind is fetched and stored in RAM.

Next, in the next step 212, as shown in FIGS. 16A to 16E, in order to allow the player to select one from a long and thin army formation, a rectangular army formation, a triangular army formation, a diamond army formation, and V-shaped army formation, an army formation selection display where icons of these formations are displayed on the TV monitor 4 is performed, and the process waits until the player selects 214 any one of the formation in step 204. When the player selects 214 any one of the formations, in the next step 216, the default value for the formation is fetched.

Incidentally, in the above steps 210 and 216, simultaneously, the soldier kind and army formation on the computer's army E have been selected, as mentioned above. In the following explanation, for convenience' sake, it is assumed that the player has selected the corps "foot soldier type", the soldier kind "foot soldier", and the army formation "triangular army formation" for the army F while the computer has selected the corps "foot soldier type", the soldier kind "foot soldier", and the formation "long and thin army formation" for the army E.

Next, in step 218, soldier numbers for identifying respective soldiers are allocated to a predetermined number (for example, 100) of soldiers, and a distance between the army E and the army F in the 3-dimensional virtual space is set so that line-up positions of all the soldiers belonging to the army E and the army F are calculated according to the default value of the formation selected in step 216 and stored in RAM. Next, in step 220, a troop commander (hereinafter, referred to as a leader) is automatically selected from the soldiers belonging to the army F (and the army E) to be set and the set information is stored in RAM. In this leader setting, any soldier positioned at an almost center of the formation is selected as the leader, and ID information for identifying the soldier as the leader together with the soldier number is assigned to the leader and stored in RAM.

Figure 6:
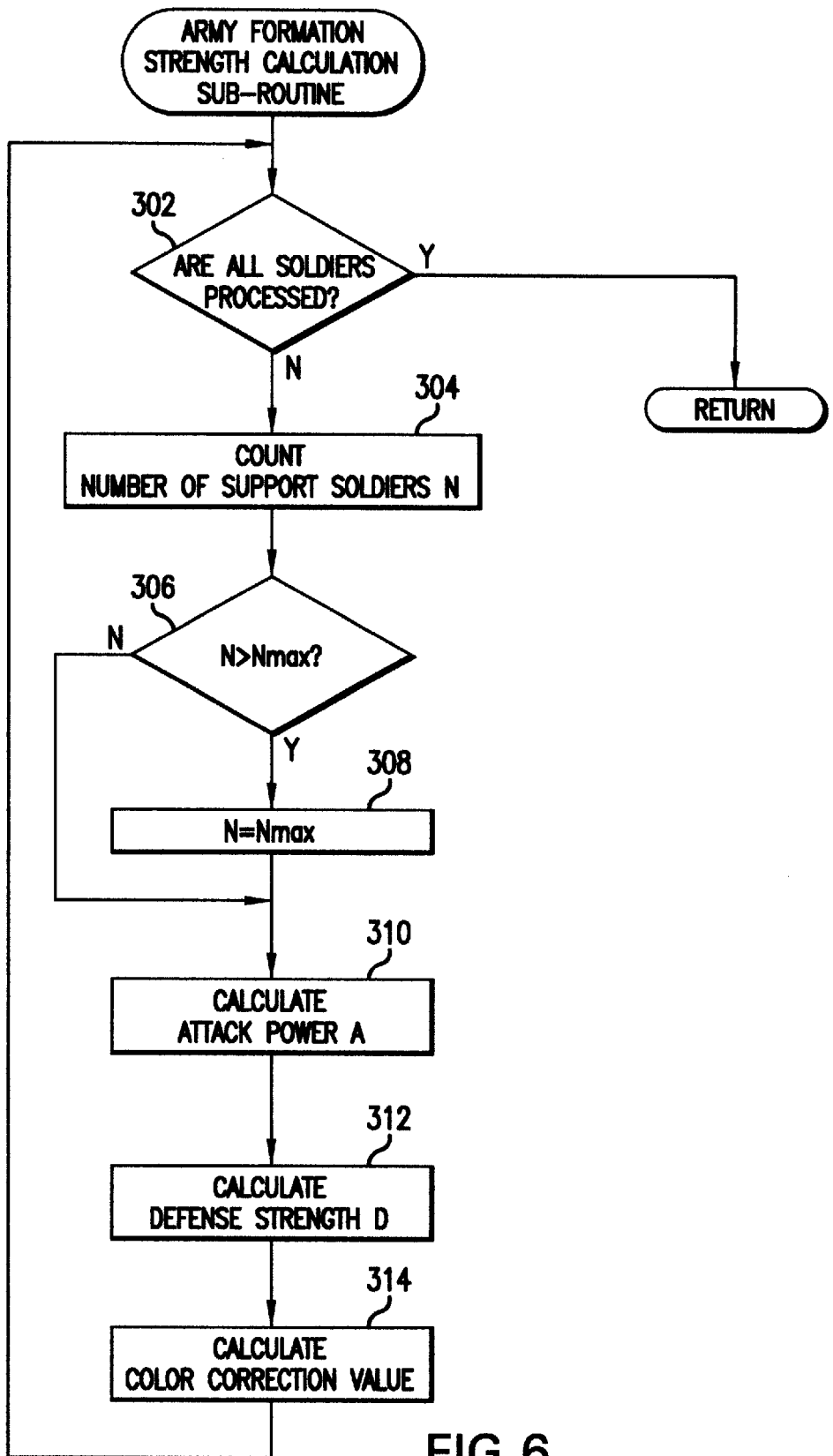
FIG. 6 is a flowchart of an army formation strength calculating sub-routine showing the details of step 222 of a formation setup process sub-routine, step 434 of a movement process sub-routine and step 524 of a battle process sub-routine.

Next, in step 222, attack values and defense values expressing attack powers and defense strengths of respective soldiers belonging to the army F (and the army E) (hereinafter, called attack power and defense strength collectively without discriminations between attack value and attack power and between defense value and defense strength) are calculated, and a formation strength calculation sub-routine for calculating color correction (adjustment) values for respective soldiers in order to display unevenness distribution of the attack power on the TV monitor 4 is called. As shown in FIG. 6, in this formation strength calculation sub-routine, in step 302, a determination is made about whether or not processing on all the soldiers has been completed. When a negative determination is made in this step, the number of support soldiers N is counted in the next step 304.

Figure 17A:
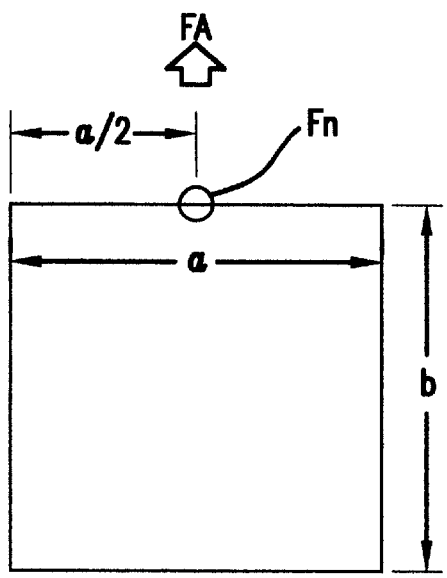
FIGS. 17A to 17C are explanatory diagrams for explaining the number of support soldiers of soldiers to be processed, FIG. 17A being an explanatory diagram for explaining defining a support range of the soldiers to be processed, FIG. 17B being an explanatory diagram for counting the number of support soldiers of the soldier to be processed in a fall-in state, and FIG. 17C being an explanatory diagram showing the number of support soldiers of soldiers to be processed in a battle state.
Figure 17B:
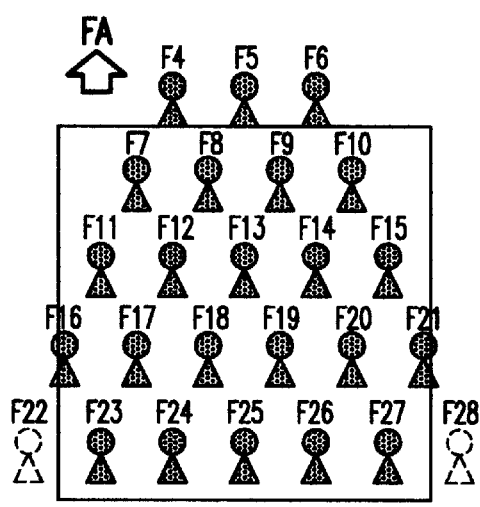

The details of this step 304 are as follows: First, in step 218, the positions of the respective soldiers of the army F stored in RAM on the 3-dimensional virtual space are read out. Next, as shown in FIG. 17A, the number N of friend soldiers existing in a support region as a predetermined region defined by a horizontal length "a" (m) and a vertical length b (m) in the 3-dimensional space (herein, explanation will be made in a 2-dimensional manner for easy understanding), namely, support soldiers supporting an object soldier Fn, is counted, assuming that the object soldier Fn exists at a center of an upper end in support region. Accordingly, for example, as shown in FIG. 17B, since the soldier with the soldier number F5 is supported by 22 soldiers with soldier numbers F4 to F27 except for the soldiers with the soldier numbers F22 and F28, the number of support soldiers N=22 is obtained. Incidentally, in FIGS. 17A and 17B, an arrow FA shows an advancing direction of a group, that is, an advancing direction of the leader. Also, in order to utilize characteristics of the corps (characters having personalities) the support region is defined in advance as shown in Table 1.

In the next step 306, in order to prevent the number of support soldiers N from being increased infinitely and prevent the object soldier Fn from exceeding the attack power and the defense strength of an actual person, a determination is made about whether or not the number of support soldiers N exceeds the maximum number of support soldiers Nmax. When a negative determination is made, the process proceeds to step 310. When an affirmative determination is made, the number of support soldiers N is set to the maximum number of support soldier Nmax 308 (15 in this embodiment) and the process proceeds to step 310. Incidentally, in the foot soldiers of this embodiment, the number of support soldiers N is put in a range of $0 \leq N \leq 15$.

Next, in step 310, an attack power A of the object soldier Fn is calculated according to the following equation (1). Incidentally, a basic attack power $\alpha$ is 50 in this embodiment, as shown in the following Table 2.

$$\text{Attack Power } A = \text{Basic Attack Power } \alpha + \text{Support Attack Power } \delta_A \quad (1)$$

where, Support Attack Power $\delta_A$=support coefficient $k_A \times$the number of support soldiers N; and support coefficient $k_A=5$

TABLE 2

|  | BASIC ATTACK POWER $\alpha$ | BASIC DEFENSE STRENGTH $\beta$ |
|---|---|---|
| FOOT SOLDIER TYPE | 50 | 50 |
| BOW SOLDIER TYPE | 75 | 25 |
| HORSE SOLDIER TYPE | 65 | 35 |

In the next step 312, a defense strength D of the object soldier Fn is calculated according to the following equation (2). Incidentally, the basic defense strength $\beta$ is 50 in this embodiment, as shown in Table 2.

$$\text{Defense Strength } D = \text{Basic Defense Strength} \beta + \text{Support Defense Strength} \delta_D \quad (2)$$

where, Support Defense Strength $\delta_D$=support coefficient $k_D \times$the number of support soldiers N; and support coefficient $k_D=5$ Next, in step 314, in order to display strength and weakness of the attack power of the object soldier Fn on the TV monitor 4, the color correction value which serves as the change value of the object soldiers Fn is calculated as the number of support soldier N (color correction value=the number of support soldier N) to be stored in RAM, and thereafter the process returns back to step 302. When the determination in step 302 is affirmative, processing on all the soldiers has been completed, so that the army formation strength calculation sub-routine is terminated and the process proceeds to step 224 where the default values (onnly first transfer) of the soldier kinds which have been respectively stored in RAM in steps 210, 218, 220 and 314, the position data of the respective soldiers, the ID information of the leader (only first transfer) and the color correction value are transferred to an image processing section 23, the army formation setting process sub-routine is terminated, and the process proceeds to step 106 in FIG. 4A. According to the formation setting process, the image process section 23 draws the soldier (foot soldiers) according to the position data, and a character wearing a protector such as an armor or the like which is different from that of the other soldiers is drawn in a line-up state.

Figure 18:
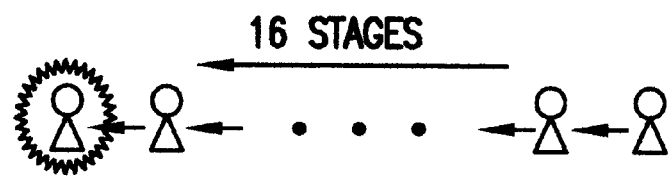
FIG. 18 is an explanatory diagram for explaining stages of the magnitude of an attack power/defense strength of each soldier.
Figure 19:
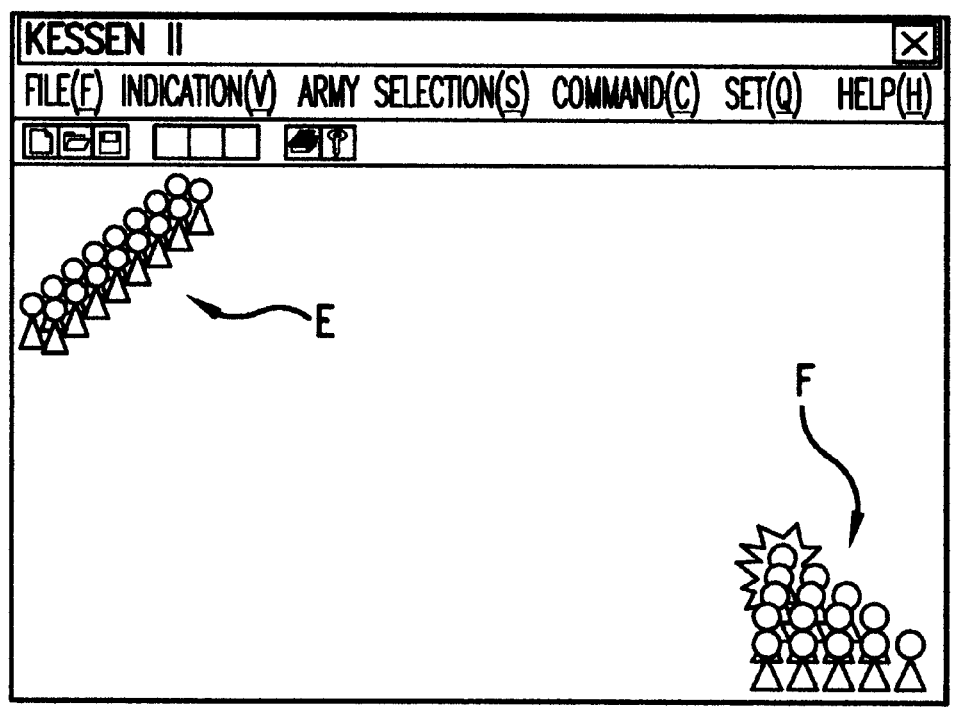
FIG. 19 is an explanatory diagram of a screen displayed on a television monitor showing an unevenness distribution of strong and weak points of attack power of each soldier and attack power of an army unit before a formation is formed and a movement process sub-routine is executed.

Here, the color correction process which is executed a sub-CPU (not shown) of the image processing section 23 and the meanings of the color correction value will be explained. In this embodiment, in order to achieve an image like movies, respective dots of an image forming the object soldier Fn are expressed on the TV monitor 4 with 256 gradations of each of RGB (red, green and blue). Now, assuming that one dot of the image has R=150, G=200 and B=170, and the color correction value is 7, the sub-CPU sets each of the maximum gradation to be color-corrected to 240 for each maximum gradation 255 on theory of RGB (incidentally, when RGB of the one dot exceeds 240, the exceeded value), and 150+(240−150)×7/15=192 for R, 200+(240−200)×7/15=219 for G and 170+(240−170)×7/15=203 for B are calculated so that the color correction process is performed such that the gradations of the respective RGB obtained are applied to the color of the dot. Accordingly, the dot approaches to "white" as the color correction value, namely the value of the attack power, becomes large. However, if the number of the maximum gradation to be applied to the color correction process is set to 255, the dot becomes pure white, which may make it difficult to distinguish existence of the soldier in view of a background color. Therefore, the maximum gradation is set to 240. The sub-CPU performs the color correction process on all the dots forming the object soldier, and further performs similar processes regarding all the soldiers. It is to be noted that the calculation equations of the color correction process and data of respective maximum gradations for color correction and the like are transferred from the CPU 20 to the image processing section 23 at the time of initial setting process. For this reason, as shown in FIG. 18, since the soldier approaches to white (the soldier looks white in a bright manner) through 16 stages (including a case of the number of support soldiers N=0), when the player watches a soldier with a large value of the attack power A on the TV monitor or display 4, as shown in FIG. 19, he/she can recognize unevenness distribution of strong and weak points of the attack power of the entire army formation. It is to be noted that a distance between the army E and the army F is set to be longer than a scope range of a large bow which a large bow soldier of the bow solder type has (for example, the distance is 200 m in the 3-dimensional virtual space), and (the scope range of the large bow is set to be longer than that of a short-range bow which a short-range bow soldier has). This setting is performed in the above-mentioned step 218.

[Attack Power and Defense Strength During Movement]

Figure 20A:
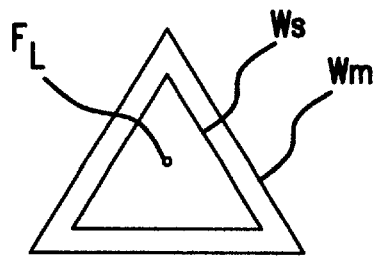
FIGS. 20A and 20B are explanatory diagrams for explaining one example of a virtual frame of an army unit, FIG. 20A being an explanatory diagram for explaining a region-size relationship between a fall-in time and a moving time and FIG. 20B being an explanatory diagram for explaining a position correction when a soldier has gone out of the frame during movement.

Next, in step 106 shown in FIG. 4A, calculation of a virtual frame is performed as pre-preparation where the army E and the army F mutually move towards leaders thereof while their army formations are maintained, respectively. As shown in FIG. 20A, assuming a virtual frame Wm employing the position of a leader $F_L$ as a center, which has similar shape to the lined-up army formation of the army F (and the army E) and which has a size of a predetermined times (for example, 1.2 times) of the lined-up army formation, a position of the virtual frame Wm in the 3-dimensional virtual space is calculated to be stored in RAM. The virtual frame Wm is a region which is virtually assumed in order to maintain the army formation when the army F (and the army E) moves. Therefore, assuming that, when the army F (and the army E) moves, this virtual frame Wm also moves, the respective soldiers are processed in assumption that the respective soldiers cannot move out of the virtual frame Wm of the armies to which they belong.

In the next step 108, a determination is made about whether or not a vertical blanking interruption processing corresponding to a vertical blanking interval of the TV monitor 4, which is called at a cycle of each 1/60 seconds (16.6 milliseconds), has been made. When a negative determination is made in step 108, a main process including processes to the input information transferred to the input receiving section 21 such as a change process of a movement direction of the leader $F_L$, a sound process for synthesizing game effect sounds in the sound process section 24, or the like is performed in the next step 110, and the process proceeds to step 116. On the other hand, when an affirmative determination is made in step 108, a movement process sub-routine for moving the army F towards the army E (the direction of the army E to the army F when viewed from the computer side) is performed.

Figure 21A:
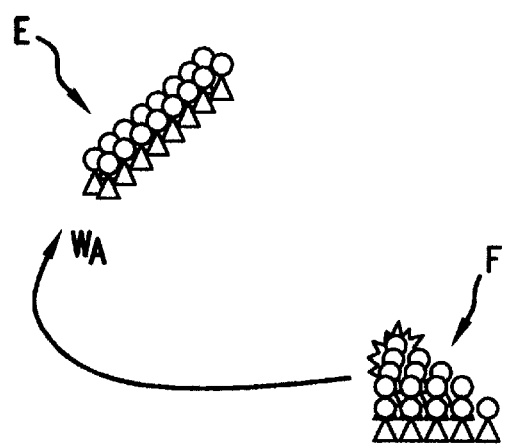
FIG. 21A is an explanatory diagram for explaining a movement tactics of a player.
Figure 21B:
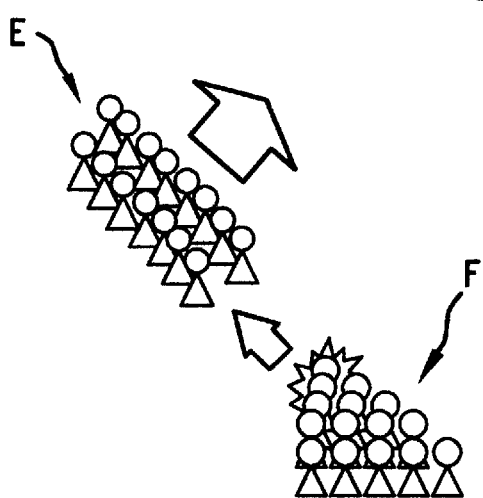
FIG. 21B is an explanatory diagram for explaining an ideal position to an enemy army unit before battle.

As shown in FIG. 21A, when the player establishes such tactics that the army F is caused to move so as to go around the army E largely along a path $W_S$ from the line-up state shown in FIG. 19, and he/she can move the army F to a side face or a rear face of the army E by using the set of cross direction buttons freely, he/she can direct a large portion of the attack power A in the army F towards a small portion of the defense strength D of the army F, so that the possibility of winning a battle against the army E is significantly increased. In the movement process sub-routine, movement of each soldier of the army F (and the army E) in the 3-dimensional virtual space is performed on the basis of such tactics.

Figure 7A:
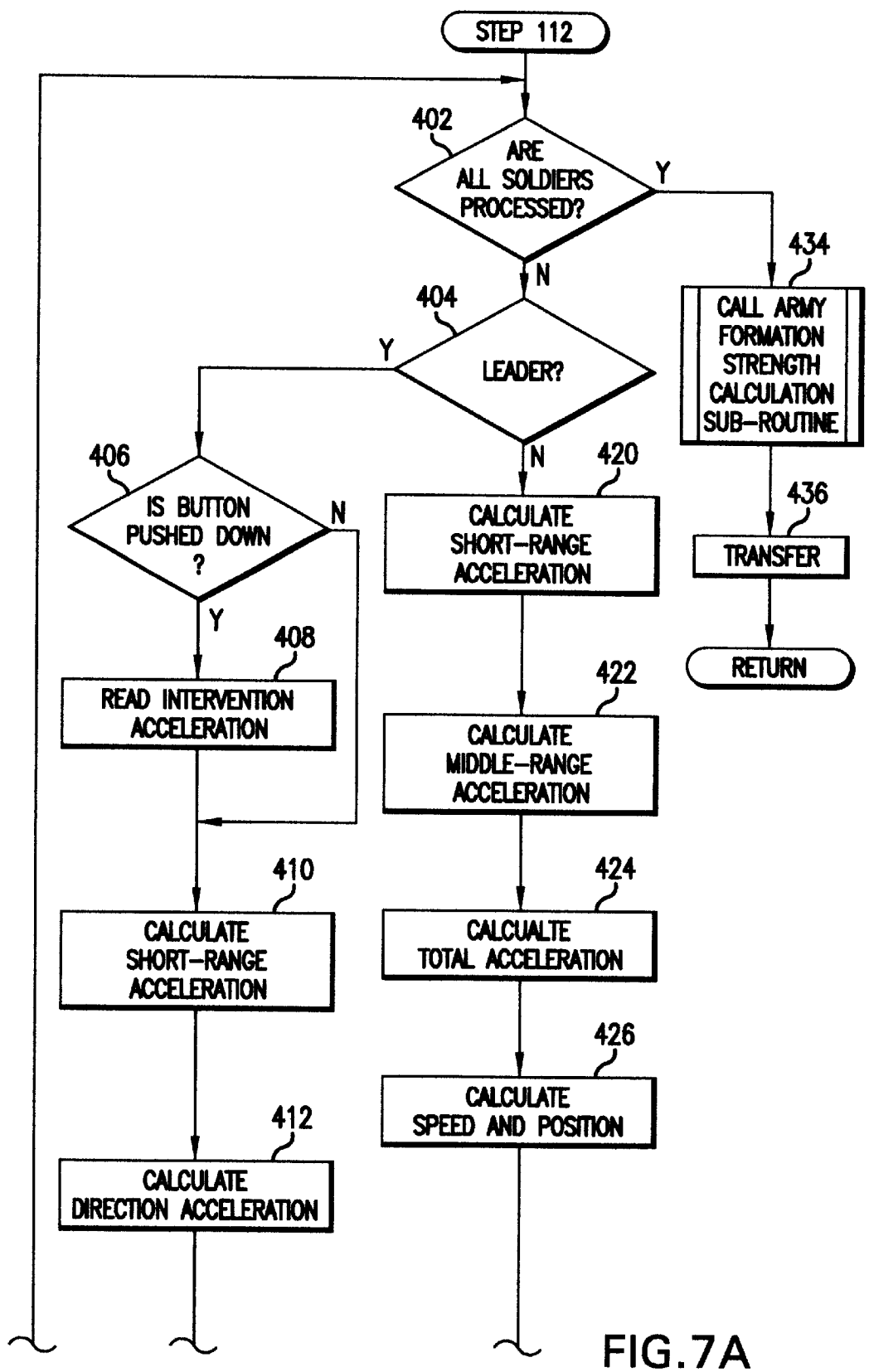
FIGS. 7A to 7B is a flowchart of the movement process sub-routine showing the details of step 112 of the battle routine.

As shown in FIG. 7A, in the movement process sub-routine, in step 402, a determination is made about whether or not the processing on all the soldiers has been completed. When a negative determination is made in step 402, a determination is made in step 404 about whether or not the object to be processed is the leader. When an affirmative determiniation is made in the step, a determination is made in the next step 406 about whether or not the set of cross-direction buttons are pressed on the basis of input information fetched in step 110 of FIG. 4A. When the determination is negative, the process proceeds to step 410, but when the determination is affirmative, an intervention acceleration is calculated to be stored in RAM in step 408. In the calculation of the intervention acceleration, when any button of the set to cross-direction buttons is pressed, a predetermined acceleration which has been stored in RAM in the initial setting process is read out. This intervention acceleration is set to, for example, (0, 10, 0), (10, 0, 0), (−10, 0, 0) and (0, −10, 0) corresponding to operations of the ↑ button 35, the → button 36, the ← button 37 and the ↓ button 38 regarding accelerations of respective (x, y, z) directions (unit in the 3-dimensional virtual space: m/sec²) (αx, αy, αz).

Next, in step 410, a short-range acceleration calculation for finding an acceleration occurring when trying to move more than a set distance to avoid coming in contact with or hitting another friend soldier is performed. In this short-range acceleration calculation, first, the short-range perception angle and the short-range perception radius which have been stored in RAM at the initial setting processing are fetched. Here, the short-range perception angle is the angle of the proximate field of view in the current direction that the soldier is facing his/her head, and in this embodiment it is set to 190°. Also, the short-range perception radius is the proximate distance that the soldier can see inside the short-range perception angle, and in this embodiment it is set to 3 m.

Figure 22:
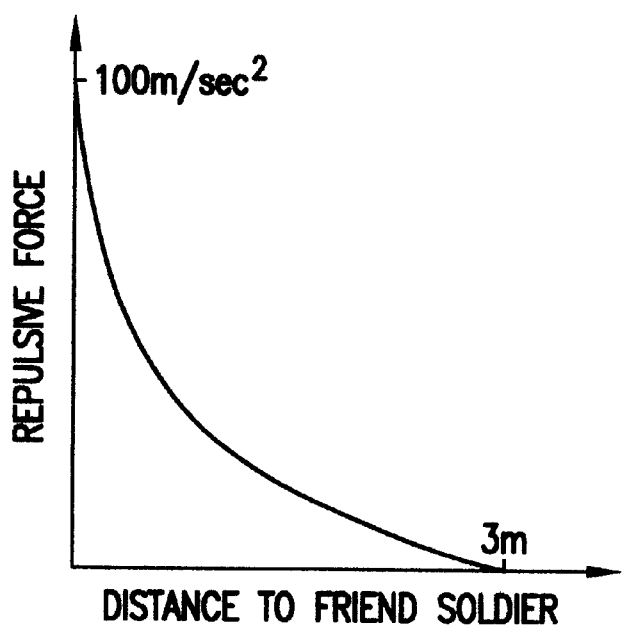
FIG. 22 is an explanatory diagram for explaining a relationship between a distance to a friend soldier and a repulsive force.

Next, the position of another soldier that has been stored in RAM during the previous vertical blanking interruption processing (1/60 seconds before) is read out, and a determination is made about whether or not another soldier is inside a short-range area drawn by the short-range perception angle and the short-range perception radius. When another soldier is in the area, the distance from that soldier is found, and the repulsive force for that distance is found. As described above, the objective is to avoid coming in contact with or hitting another soldier in a short-range, so when another soldier comes near, it is desired to quickly move away from that soldier. Therefore, as shown in FIG. 22, the repulsive force is taken along the vertical axis and the distance is taken along the horizontal axis, the relationship between the repulsive force and the distance, as in the case of a quadratic function, is calculated such that the repulsive force rapidly increases as the distance from another soldier becomes small. Therefore, the repulsive force when the distance is 0 becomes a large value such as 100 m/sec², and when the distance is equal to the short-range perception radius, the repulsive force becomes 0 m/sec². The product of the acceleration obtained by dividing this found repulsive force by the mass of the soldier and the vector in the direction from another soldier towards the object soldier is found for each of components αx, αy and αz, and the result is the short-range acceleration. Moreover, a determination is made about whether or not yet another friend soldier is in the short-range area. When the determination is affirmative, the repulsive force is found in the same way, the acceleration is found from the found repulsive force, the x, y and z components are added to the short-range acceleration found before and the result is stored in RAM as short-range acceleration (αx, αy, αz). The process then advances to step 412. On the other hand, when there is no other soldier in the short-range area, then, the repulsive force is 0, similar to the case when the distance is equal to the short-range perception radius, so that the short-range acceleration (αx, αy, αz)=(0, 0, 0) is stored in RAM, and the process advances to step 412.

In step 412, a direction acceleration for moving towards the leader of the army E is calculated and stored in RAM, providing for the case that the player does not intervene the advancing direction of the army F by the set of cross-direction buttons. In this calculation of direction acceleration, the direction in the 3-dimensional virtual space is calculated from the positions of the leaders of the armies E and F, and the direction accelerations which have been stored in RAM in the initial setting process is read out. This direction acceleration is set to 1.2 m/sec² in a scalar value (absolute value). Accordingly, by calculating the scalar value for each direction component, the direction acceleration (αx, αy, αz) can be found.

In the next step 414, the intervention acceleration, the short-range acceleration and the direction acceleration which have been stored in RAM in steps 408, 410 and 412 are read out, and for each of the x, y and z components, they are added to calculate the total acceleration, and in the next step 416, the latest velocity and the latest position are calculated to be stored in RAM. The process then advances to step 418. Here, assuming that the current time is t, the elapsed time is δt, the velocity is V ($V_{t+\delta t}$: velocity at time t+δt, $V_t$: velocity at time t), acceleration is α (αt: acceleration at time t), and position is P ($P_{t+\delta t}$: position at time t+δt, Pt: position at time t), it is possible to obtain the latest velocity and the latest position for each of the x, y and z components from the equations of motion using Euler's method shown in the following Equations (3). It is to be noted that the previous velocity and position have been stored in RAM, and the elapsed time δt is 1/60 seconds which is known.

$$V_{t+\delta t}=Vt+\alpha_t\delta_t; \text{ and}$$

$$P_{t+\delta t}=P_t+V_t\delta_t+0.5\alpha_t\delta_t^2 \quad (3)$$

Next, in step 418, the position of the latest virtual frame Wm is calculated from the latest position of the leader $F_L$, and the process returns back to step 402.

On the other hand, when a negative determination is made in step 404, in step 420 the short-range acceleration is calculated and stored in RAM in the same manner as the above-mentioned step 410, and in the next step 422 a middle-range acceleration calculation which obtains an acceleration occurring when trying to move at the same velocity as that of a neighboring soldier is performed. In this middle-range acceleration calculation, a middle-range perception angle and a middle-range perception radius which have been stored in RAM at the initial setting process are read out. Here, the middle-range perception angle is the angle of a middle-range field of view in the current direction that the soldier is facing his/her head, and in this embodiment it is set with 170° which is smaller than that of the short-range perception angle. Also, the middle-range perception radius is the distance that the soldier can see in the middle-range perception angle, and in this embodiment the default value is 7 m which is longer than the distance of the short-range perception distance. Next, the position of another soldier which has been stored in RAM previously (1/60 seconds before) is read out, and a determination is made about whether or not the another soldier is in the middle-range area defined by the middle-range perception angle and the middle-range perception radius.

When there is no other soldier in the area, first a direction vector (x, y, z) to the leader is obtained in order to trace the leader at the maximum velocity (for example, 5 m/sec). Here, the direction vector is a unit vector which has no meaning about magnitude (length), and it is a vector (x, y, z) having meaning about only direction. It is possible to obtain the direction vector (x, y, z) to the leader by finding a difference of the own position from the position of the leader to produce a unit vector. Next, the acceleration is calculated according to the following equation (4) to be stored in RAM. It is to be noted that in the equation (4) (the same in equation (5)) velocity equalization time is a time parameter used when the acceleration is found from the movement velocity, and in this embodiment it is set to 0.1 seconds.

Acceleration (x, y, z)={direction vector (x, y, z) to leader×maximum velocity−current velocity (x, y, z)}/velocity equalization time  (4)

On the other hand, when there is (are) other soldier(s) in the middle-range area, an acceleration conforming with an average velocity of other soldier(s) in the middle-range area is calculated according to the following equations (5) and stored in RAM. The process then advances to step 424.

Average Velocity (x, y, z)=sum (x, y, z) of velocities of soldiers in middle-range area/number of soldiers in middle-range area; and Acceleration (x, y, z)={average velocity (x, y, z)−current velocity (x, y, z)}/velocity equalization time  (5)

Figure 20B:
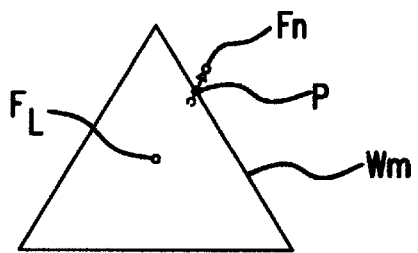

In the next step 424, the short-range acceleration and the middle-range acceleration which have been stored in steps 420 and 422 are read out, and are added for each of the components x, y and z to calculate the total acceleration. In the next step 426, the current velocity and position are calculated according to the above equation (4). In the next step 428, as shown in FIG. 20B, a determination is made about whether the position of the object soldier Fn is in the previous virtual frame Wm. When an affirmative determination is made, the process advances to step 432. On the other hand, when a negative determination is made, the position of the crossing point P between the direction of the vector of the total acceleration and the virtual frame Wm is calculated in step 430, and the position of the object soldier is corrected to the calculated position. In step 432, the latest velocity and the latest position which have been calculated in step 426 and step 430 are stored in RAM and the process returns back to step 402.

On the other hand, when an affirmative determination is made in step 402, in the next step 434 the army formation strength calculation sub-routine is called, and the attack power A, the defense strength D and the color correction value are calculated like step 222 in FIG. 5. In step 436, the position data and the color correction value of each soldier is transferred to the image processing section 23, and the movement process sub-routine is terminated so that the process advances to step 114 in FIG. 4A.

Figure 7B:
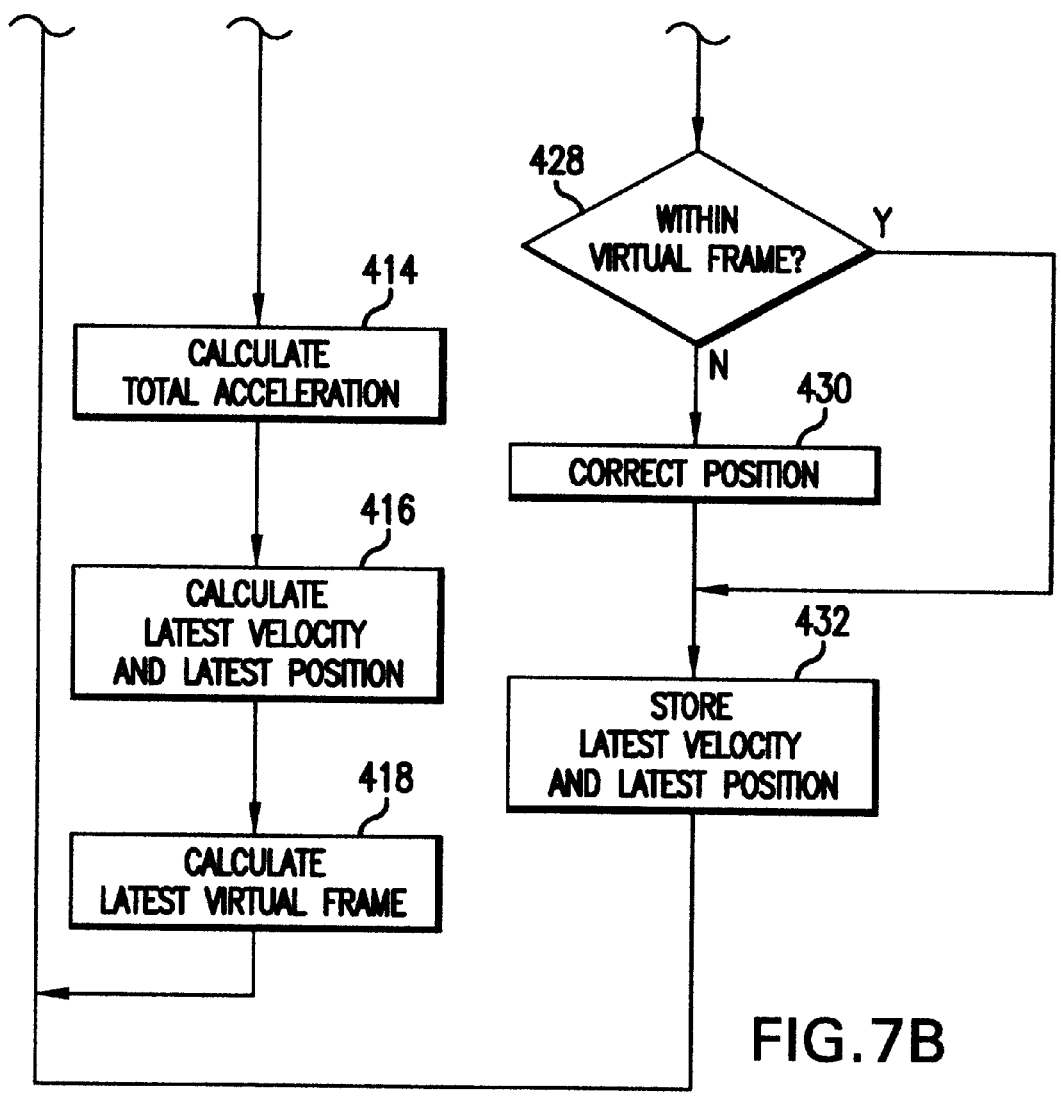

In step 114, the distance between both leaders is calculated from the positions of the leaders of the army E and the army F which have been calculated in step 416 of FIG. 7B, and in the next step 116 a determination is made about whether or not the calculated distance is smaller than the predetermined distance (for example, 100 m in a case that one or both of the corpses of the armies E and F is the bow soldier type; 50 m in case that both thereof are the foot soldier type or the horse soldier type). When the determination is negative, the process returns back to step 108. Thereby, an aspect where the army E and the army F move towards the respective leaders (or the army F is avoiding the army E by intervention of the player) while they are keeping their army formations 1.2 times the line-up states and while displaying strong and weak points in the attack power A and the defense strength D is displayed on the display 4.

[Attack Power and Defense Strength During Battling State]

When the determination is affirmative in step 116, in the next step 118, a determination is made about whether or not an interruption has occurred by determining whether or not the vertical blanking interruption processing has been executed in the same manner as step 108. When the determinations is negative, in step 120, processing for the input data or information transferred from the input receiving section 21, such as stopping of the leader $F_L$, or the main processing such as audio processing for making the audio processing section 24 synthesize game sound-effects are executed and the process advances to step 124. On the other hand, when the determination is affirmative, the battle process routine where the soldiers belonging to the army E and the arm F battle against one anther is executed in step 122.

Figure 8A:
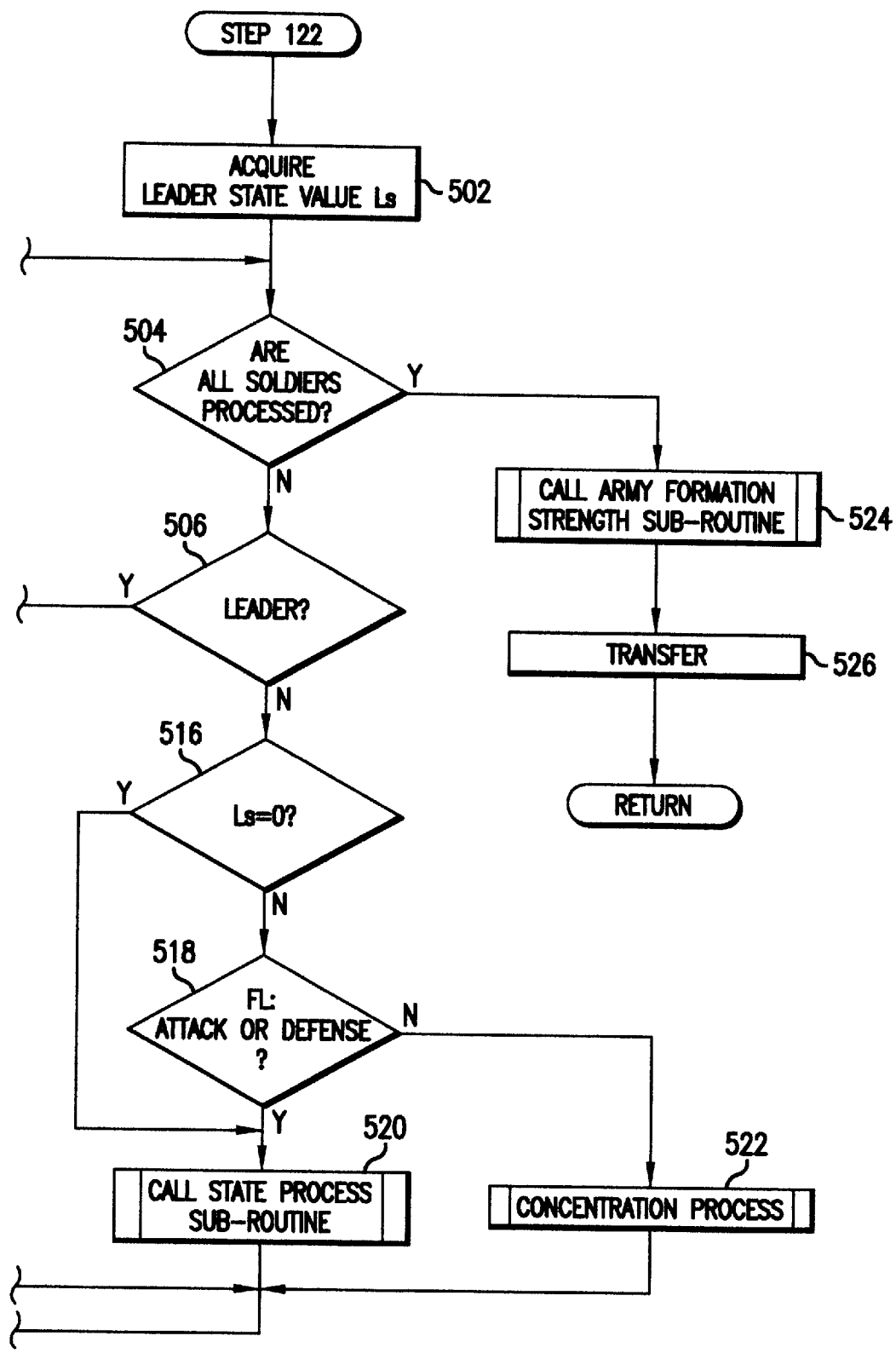
FIGS. 8A to 8B is a flowchart of the battle process sub-routine showing the details of step 122 of the battle routine.
Figure 8B:
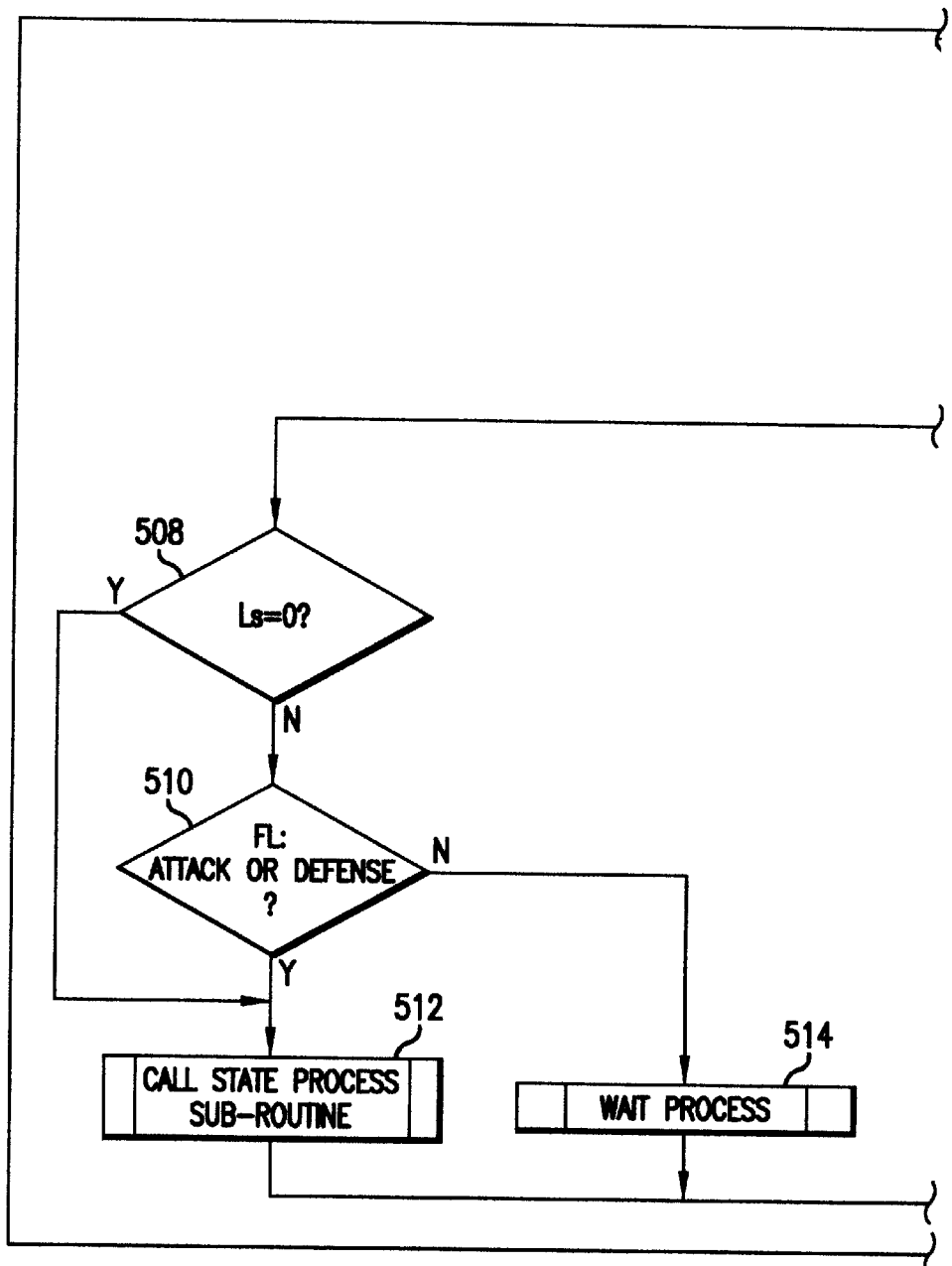

As shown in FIGS. 8A through 8B, in the battle process sub-routine, a leader state value Ls expressing an advancing state or a stopping state of the leader is acquired in step 502. The leader during the battle process advances towards the enemy leader earnestly as far as there is no enemy soldier in a predetermined region described later. Therefore, the leader state value Ls is normally the default value 0 expressing the advancing state, and when the player presses the ↓ button 38 of the input device 3, it becomes the default value 1 expressing the stop state.

Next, in step 504, a determination is made about whether or not processing on all the soldiers has been completed. When the determination is negative, in step 506, whether or not the object soldier is the leader is made in step 506. When the determination is affirmative, in the next step 508, whether or not the leader state value Ls is 0 is made. When the determination is affirmative in step 508, the process advances to step 512, but when the determination is negative, whether the status flag expressing state of the soldier is attack or defense is determined in step 510, as shown in Table 3.

TABLE 3

| STATE | OUTLINE OF STATE |
|---|---|
| ENEMY-SEARCH | STATE OF SEARCHING FOR ENEMY SOLDIER |
| APPROACH | STATE OF REDUCING DISTANCE FROM ENEMY TO MOVE WITHIN BATTLE RADIUS |
| ATTACK | STATE OF DAMAGING ENEMY WITH WEAPON |
| DEFENSE | STATE OF PROTECT HIMSELF/HERSELF FROM ENEMY'S WEAPON |
| DEATH | STATE OF DEATH OF SOLDIER |
| OTHER | VARIOUS STATES SUCH AS CONFRONTATION, COLLAPSE, ESCAPE OR THE LIKE |

Figure 9:
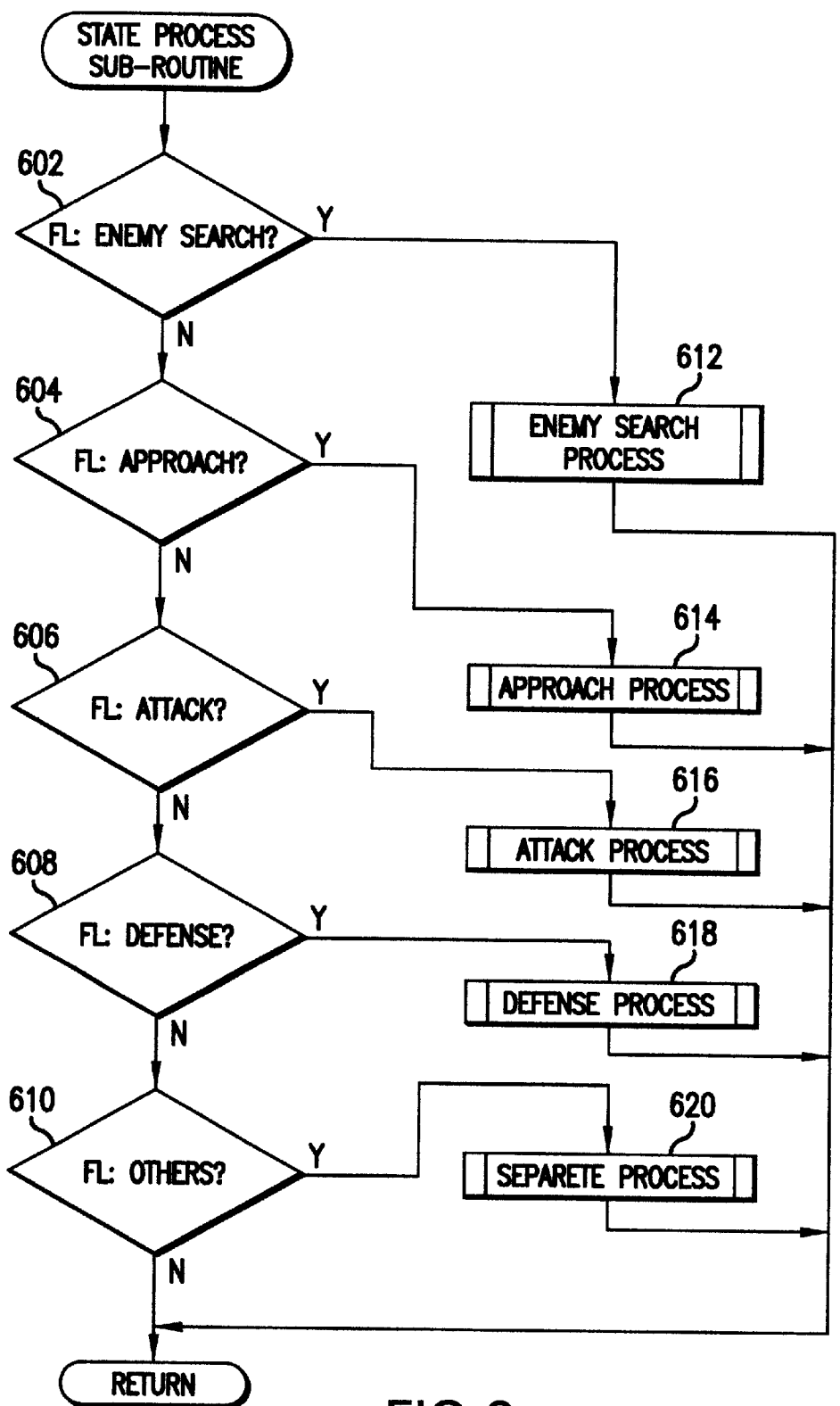
FIG. 9 is a flowchart of a process state sub-routine showing the detail of steps 512 and 520 of the battle process sub-routine.

In step 512, the state process sub-routine which performs processing in response to the state of the object soldier (default value of the status flag $F_L$) is called out. As shown in FIG. 9, in this state process sub-routine, in steps 602 to 610, whether the status flag $F_L$ is enemy-search, approach, defense, or the other is determined. When the determination is affirmative in each step, in each of steps 612 to 620, each sub-routine of the enemy-search process, the approach process, the attack process, the defense process and the other process is executed to terminate the status process sub-routine. The process returns back to step 504 shown in FIG. 8A.

Figure 10:
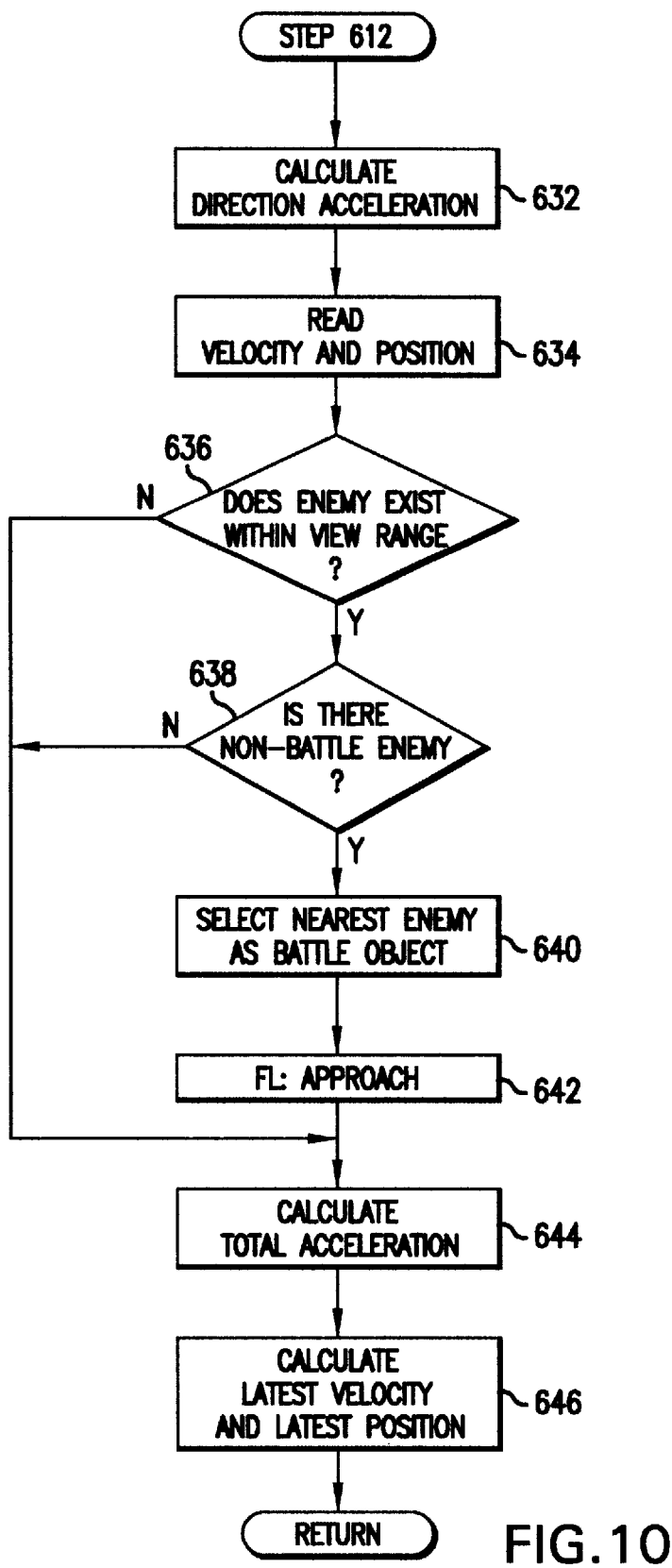
FIG. 10 is a flowchart of an enemy-search process sub-routine showing the details of step 612 of the state process sub-routine.

As shown in FIG. 10, in the enemy-search sub-routine, in step 632, the direction acceleration is calculated by setting the leader to the enemy leader in the above equation (4) and is stored in RAM. Next, in step 634, the previous velocity and position are read out, and in step 636, whether or not there is any enemy soldier within the view range (equal to the above-mentioned middle-range area) of the object soldier (in this case, leader) is determined by reading the previous position data of the enemy. When the determination is affirmative, in the next step 638, whether or not the current state is a non-battle state is determined by determining whether or not the current state is the enemy-searching state by referring to the status flag of the enemy soldier. When the determination is affirmative, the nearest enemy is selected as the battle object in step 640, and in the next step 642, matching is made by setting the status flags $F_L$ of the object soldier and the enemy soldier and the process advances to step 644. On the other hand, when the determinations (judgements) are negative in steps 636 and 638, the process advances to step 644 like the above.

In step 644, the short-range acceleration of the object soldier is calculated in the same manner as the above, and this short-range acceleration and the direction acceleration which has been stored in RAM in step 632 are read out and are added for each of the components x, y and z to calculate the total acceleration ($\alpha x$, $\alpha u$, $\alpha y$). In the next step 646, the latest velocity and the latest position are calculated according to the above equation (3) to be stored in RAM. Thus, the enemy-search sub-routine is terminated.

Figure 11:
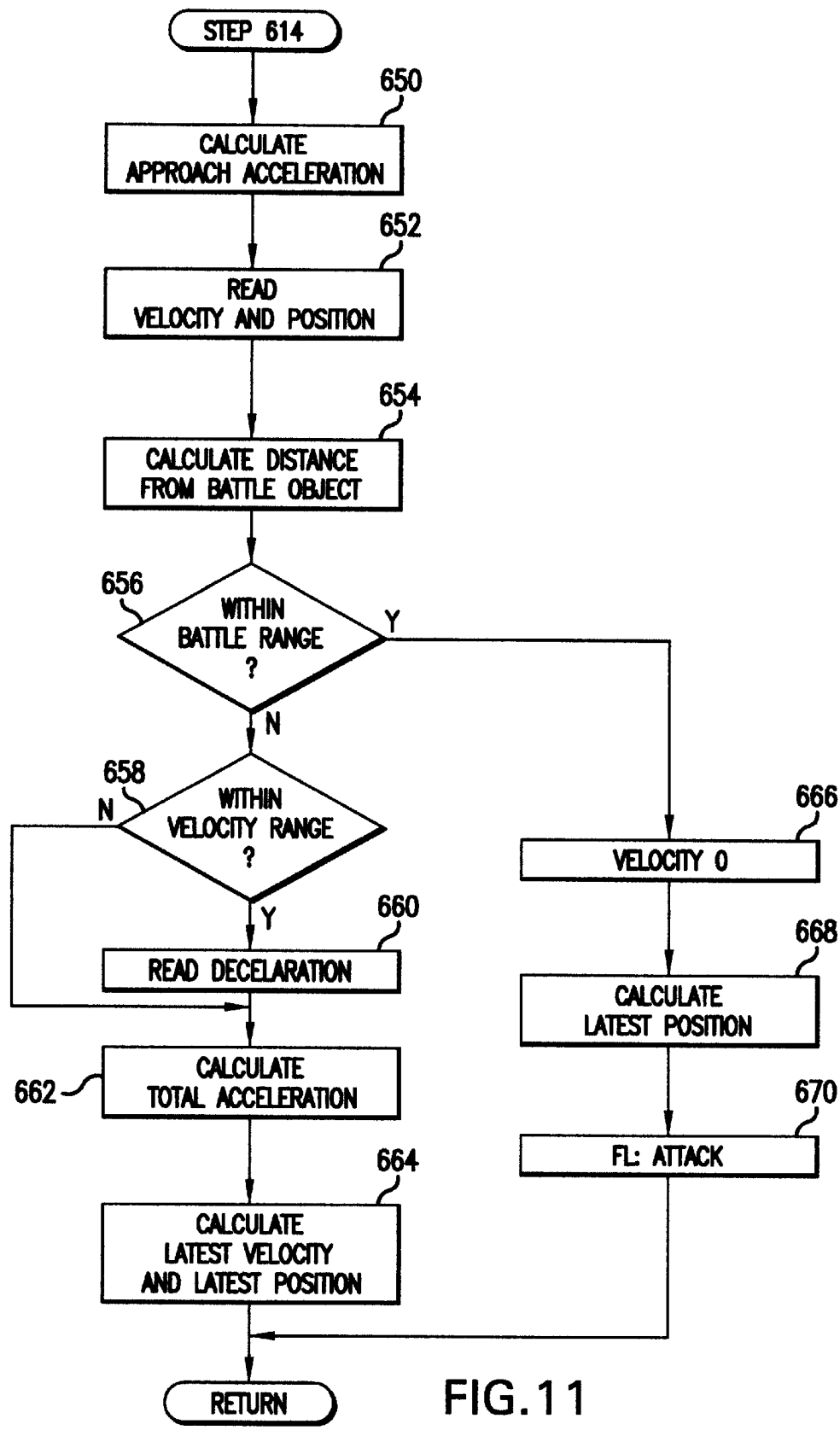
FIG. 11 is a flowchart of an approach process sub-routine showing the details of step 614 of the state process sub-routine.

As shown in FIG. 11, in the approach process sub-routine, in step 650, the approach acceleration is calculated by setting the leader to the enemy soldier of the battle object in the above equation (4) is calculated and stored in RAM. In the next step 652 the previous velocity and position are read out, and in step 654 a distance from the enemy soldier is calculated, and a determination is made about whether or not the calculated distance is smaller than the set distance stored in RAM in the initial setting process. This set distance varies according to the soldier kinds. For example, in the case of the foot soldier, the distance is 2 m, in the case of the spearman, it is 3 m, in the case of the short-range bow soldier, it is 100 m. when the determination is negative in step 656, in the next step 658, a determination is made about whether or not the current velocity is a velocity distance where the current speed is maintained in order to determine whether the soldier should advance to the enemy soldier while the current velocity is maintained or the soldier should decelerate. This velocity distance also varies according to the soldier kinds. In the case of the foot soldier in this embodiment, the velocity distance is set to the same as the short-range region. When the determination is negative in step 658, the process advances to step 662, but when the determination is affirmative, in the next step 660, the deceleration (for example, −2 m/s$^2$) for reducing the velocity to the enemy soldier is read out of RAM in which the deceleration has been stored in the initial setting process.

In step 662, the short-range acceleration of the object soldier is calculated in the same manner as the above, and this short-range acceleration, and the approach acceleration and the deceleration which have been respectively stored in RAM in steps 650 and 660 are added for each of the components x, y and z to calculate the total acceleration ($\alpha$z, $\alpha$y, $\alpha$z). In the next step 664, the latest velocity and the latest position are calculated and stored in RAM according to the equation (3) and the approach sub-routine is terminated.

On the other hand, when the determination is affirmative in step 656, in the step 666, the latest velocity of the object soldier is set to 0, and in the next step 668, the latest velocity and the latest position are calculated according to the equation (3) and stored in RAM. In the next step 670, a random number is acquired. When the random number is odd, the status flag $F_L$ of the object soldier is taken to be attack and the status flag of the enemy soldier against the object soldier is taken to be defense, but when the random number is even, the status flags of the object soldier and the enemy soldier are reversed, and the approach process sub-routine is terminated.

Figure 12:
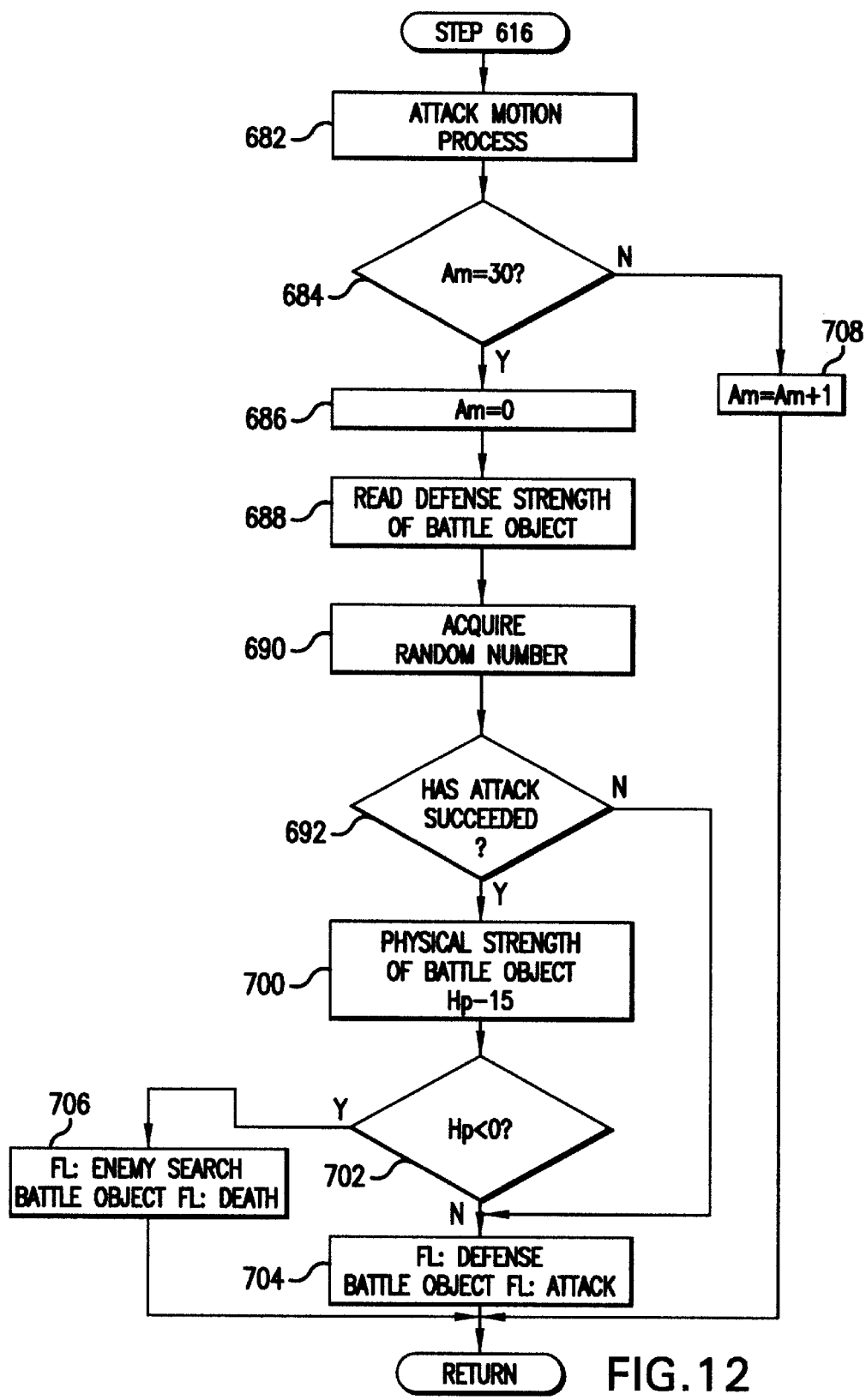
FIG. 12 is a flowchart of an attack process sub-routine showing the details of step 616 of the state process sub-routine.

As shown in FIG. 12, in the attack process sub-routine, in step 682, a drawing process for attack motion is instructed to the image processing section 23, and in the next step 684, a determination is made about whether or not an attack motion counter Am is 30 in order to determine whether or not the attack motion is terminated, so that a determination is made about whether or not a time required for the attack motion, or the attack counter Am×the vertical blanking interruption time 1/60 seconds=0.5 seconds have elapsed. When the determination is negative in the step, the attack motion is continuing so that in step 708 the value of the attack motion counter Am is incremented by 1, and the attack process sub-routine is terminated. When the determination is affirmative, in the next step 686, the value of the attack motion counter Am is cleared (0).

In step 688, the defense strength D of the enemy soldier of the battle object which has been stored in RAM previously is read out and in the next step 690 a random number value within a predetermined numeral range is obtained.

Next, in step 692, by determining whether or not the random number value is larger than the defense value, a determination is made about whether or not the attack to the enemy soldier has succeeded. When the determination is negative, the process advances to step 704. When the determination is affirmative, 15 is decreased from the physical strength Hp of the enemy soldier in step 700. It is to be noted that the value of the physical strength Hp of each soldier before entering in the battle process sub-routine is set to 100, and in order to express differences due to weapons, for example, when the soldier of the bow type has succeeded in attack, subtraction of 101 is performed, and when the soldier of the horse type has succeeded in attack, subtraction of 50 is performed. In the next step 702, a determination is made about whether or not the physical strength Hp of the enemy soldier is smaller than 0. When an affirmative determination is made in the step, the status flag $F_L$ of the object soldier is taken to be enemy-search and the status flag $F_L$ of the enemy soldier is taken to be death in step 706, and the attack process sub-routine is terminated. On the other hand, when the determination is negative, in order to conducting switching between attack and defense, the status flag $F_L$ of the object soldier is made defense and the status flag $F_L$ of the enemy soldier is made attack, and the attack process sub-routine is terminated.

Figure 13:
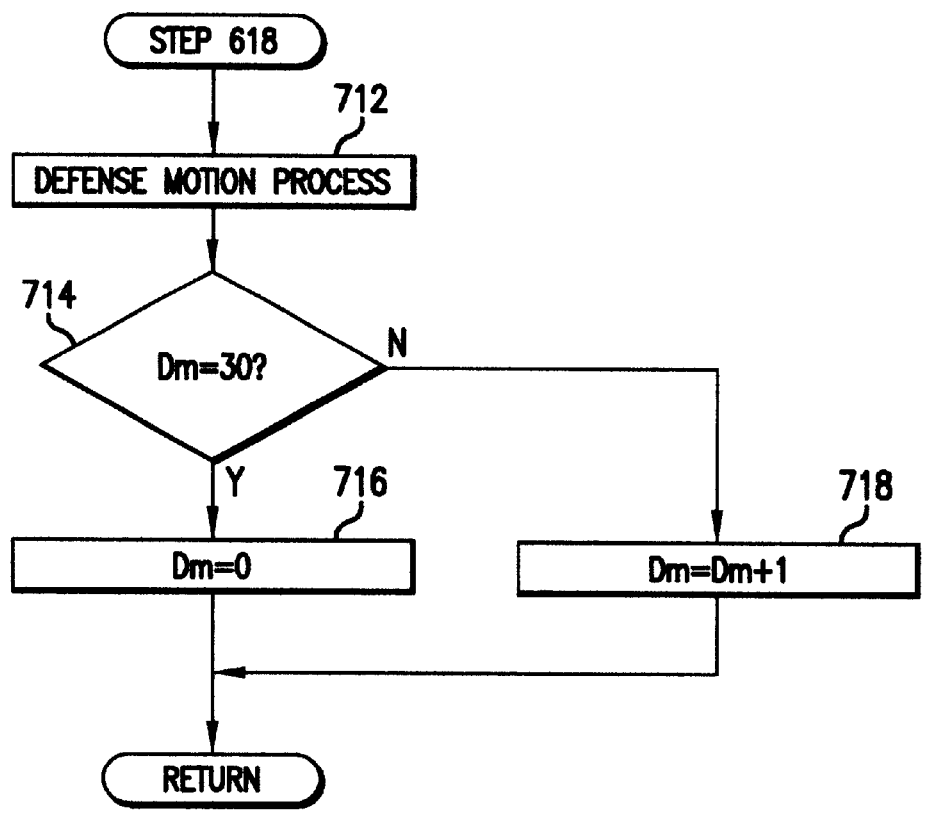
FIG. 13 is a flowchart of a defense process sub-routine showing the details of step 618 of the state process sub-routine.

As shown in FIG. 13, in the defense process sub-routine, in step 712, the drawing process of the defense motion is instructed to the image processing section 23, and in the next step 714, a determination is made about whether or not a defense motion counter Dm is 30 in order to determine whether or not the defense motion is terminated, so that a determination is made about whether or not a time required for the defense motion, 0.5 seconds have elapsed. When the determination is negative in the step, the defense motion is continuing so that in step 718 the value of the defense motion counter Dm is incremented by 1, and the attack process sub-routine is terminated. When the determination is affirmative, in the next step 716, the value of the attack motion counter Am is cleared.

In separate process in step 620 in FIG. 9, various processes such as a confrontation process (a state where a soldier watch an enemy soldier against each other), a fall process (state where a soldier of the horse soldier type falls down form a horse or an elephant), an escape process (state where a friend soldier escapes to the side opposed to an enemy soldier) or the like may be conducted.

Figure 14:
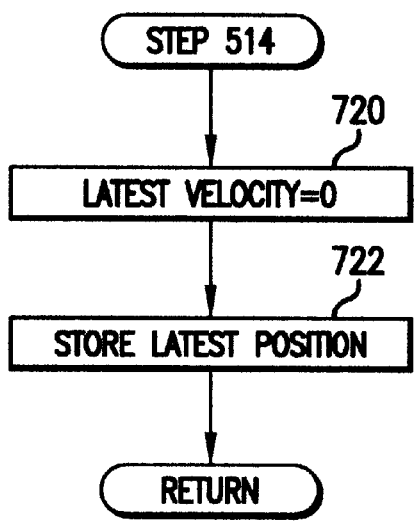
FIG. 14 is a flowchart of a wait process sub-routine showing the details of step 514 of the battle process sub-routine.

On the other hand, when the determination is negative in step 510 in FIG. 8B, in step 514, a wait process sub-routine for conducting waiting (stopping) in order to increase the attack power A and the defense strength D is executed. As shown in FIG. 14, in the wait process sub-routine, in step 720, the latest velocity of the object soldier is stored as 0 in RAM, and in the next step 722, the previous position is stored as the latest velocity in RAM.

Also, when a negative determination is made in step 506, in the next step 516, a determination is made about whether or not the leader status value Ls is 0. When the determination is affirmative in step 516, the process advances to step 520, but when it is negative, a determination is made in step 518 about whether the status flag $F_L$ is attack or defense. When an affirmative determination is made, the process advances to step 520. In step 520, the status process sub-routine is called like step 512. On the other hand, when a negative determination is made in step 518, a concentration process sub-routine for concentrating soldiers about a leader to re-build an army formation is executed.

Figure 15:
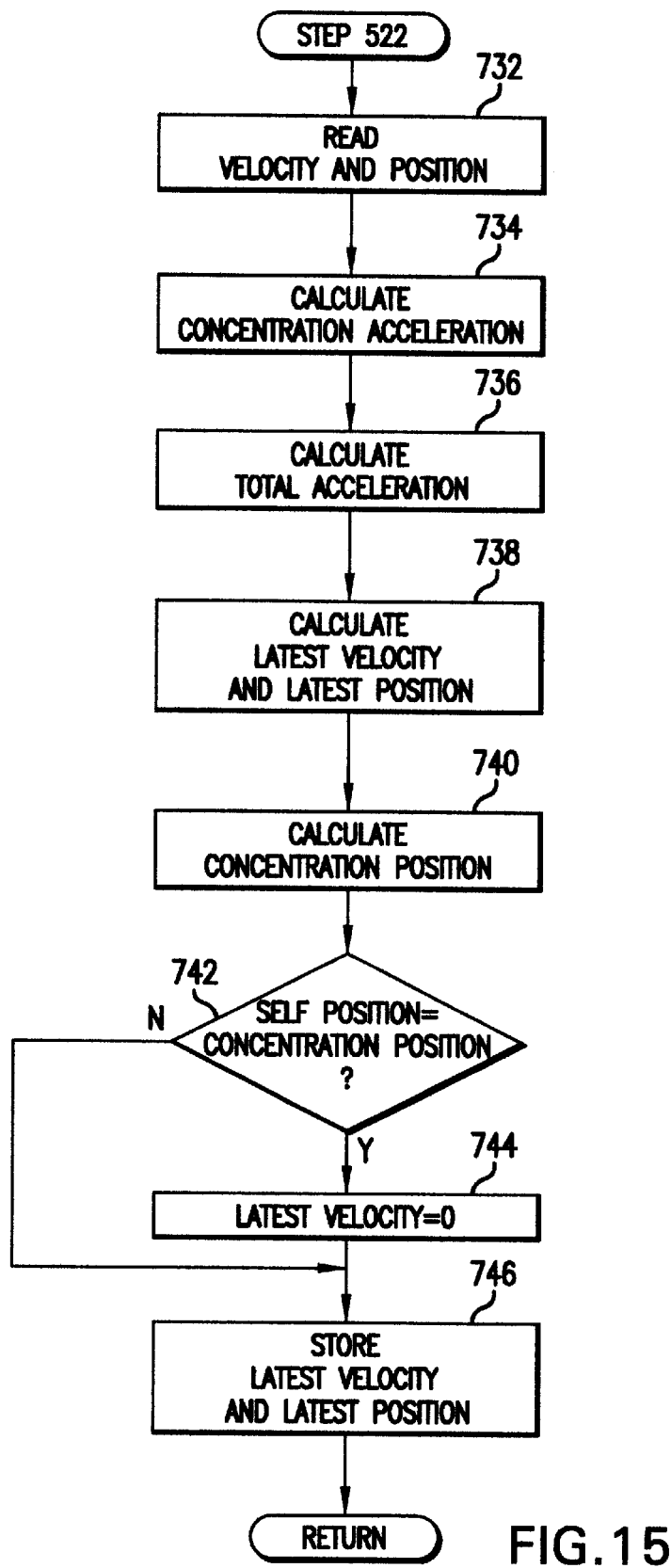
FIG. 15 is a flowchart of an assembly process sub-routine showing the details of step 522 of the battle process sub-routine.
Figure 16A:
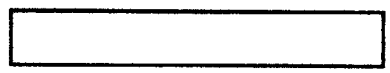
FIGS. 16A to 16E are explanatory diagrams of formations which army unit E and army unit F can adopt, that respectively show a thin formation, a rectangular formation, a diamond-shape formation, and a V-shaped formation.
Figure 16B:
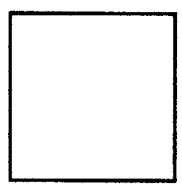
Figure 16C:
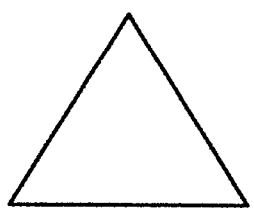
Figure 16D:
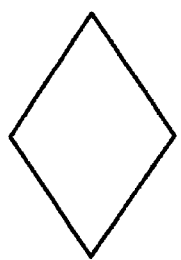
Figure 16E:
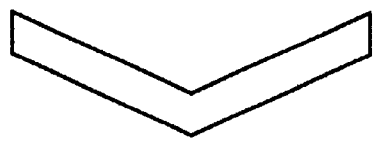

As shown in FIG. 15, in this concentration process sub-routine 522, the previous position f the leader and the previous position and velocity of the object soldier are read out 732 from RAM, and in the next step 734, a concentrating acceleration for concentration about the leader is calculated according to the above-mentioned equation (4) and stored in RAM. In the next step 736, the short-range acceleration of the object soldier is calculated like the above, and this short-range acceleration and the concentration acceleration which has been stored in RAM in step 734 are read out and they are added for each of the components x, y and a to the total acceleration ($\alpha z, \alpha y, \alpha z$). In step 738, the latest velocity and the latest position are calculated for each of the components x, y and z according to the above-mentioned equation (3).

In the next step 740, a relative position of the object soldier to the leader in the army formation calculated and selected in step 106 of FIG. 4A is read out, and the current position of the object soldier to the current position of the leader is calculated as a concentration position to be concentrated. Next, in step 742, a determination is made about whether or not the object soldier has concentrated at the concentration position by determining whether or not the position of the object soldier which has been calculated in step 738 is in a predetermined region of the concentration position which has been calculated in step 740 (for example, in a range of a circle or sphere defined by a radius of 1 m in the 3-dimensional virtual space). When a negative determination is made in step 742, the process advances to step 746, but when an affirmative determination is made, the latest velocity is made 0 (m/sec) in the next step 744, and the latest velocity and the latest position which have been calculated in steps 738 and 744 are stored in RAM.

On the other hand, when the affirmative determination is made in step 504 of FIG. 8A, the army formation strength calculation sub-routine is called in the next step 524, the attack power A, the defense strength D and the color correction value are calculated in the same manner as the step 222 of Fig. 5. In step 526, the position data and the color correction values of each soldier are transferred to the image processing section 23 and the battle process sub-routine is terminated so that the process advances to step 124. Since such a process is conducted for each vertical blanking interruption (1/60 seconds), an aspect where the attack power A during a battle state varies momentarily is displayed on the TV monitor 4.

Figure 17C:
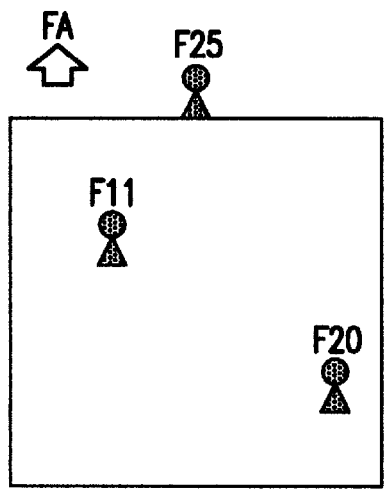
Figure 23:
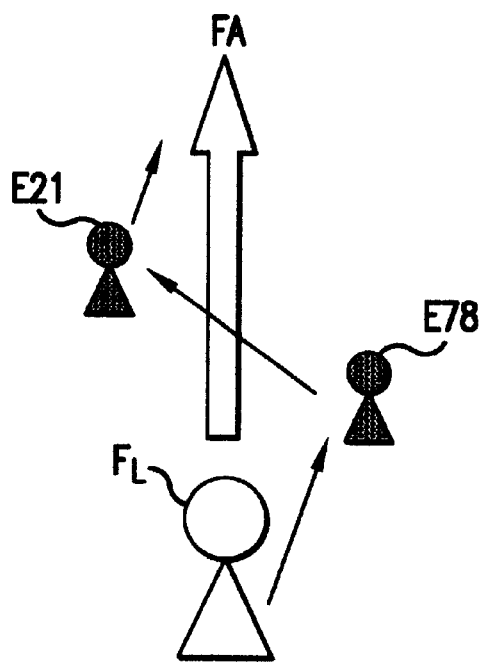
FIG. 23 is an explanatory diagram for explaining a movement of a leader during a battle.
Figure 24A:
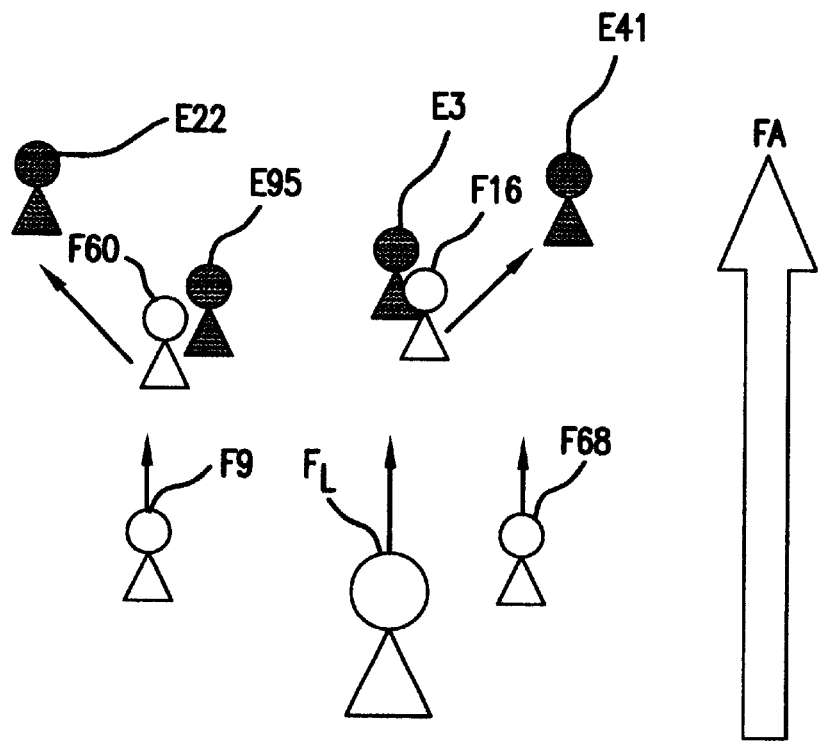
FIGS. 24A and 24B are explanatory diagrams for explaining movement of a soldier in a battle state, FIG. 24A showing movement of a soldier during advancing of the leader and FIG. 24B showing movement of a soldier during waiting state of the leader.
Figure 24B:
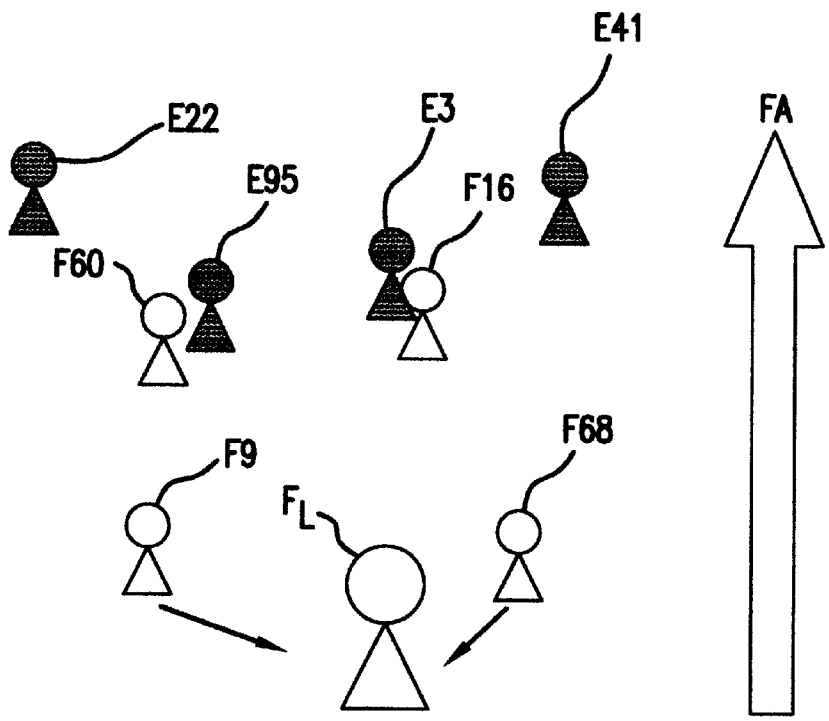

Here, the battle process sub-routine shown in FIGS. 8A through 8B will be explained in a collecting manner. As shown in FIG. 23, the leader $F_L$ of the army F moves in a direction of arrow FA where the leader of the army E exists in an advancing state unless there is an intervention of the player (stop instruction issued by operation of the ↓ button 38), but when an enemy soldier put in a non-battle state (for example, E78) exists in the predetermined range about the leader $F_L$, the leader $F_L$ finally battles against the leader of the army E while the leader $F_L$ is battling against the enemy soldier. On the other hand, the soldier belonging to the army F advances towards the leader of the army E who the leader $F_L$ targets while the leader $F_L$ is advancing to the leader of the army E, as shown in FIG. 24A. However, since the friend soldiers performs enemy-search to battle against an enemy soldier searched during the advancing state, the army formation is expanded gradually according to the time going on, which results in collapse of the army formation of the line-up state or movement state. Therefore, as shown in FIG. 17C, the number of support soldiers N become small, and the attack power A and the defense strength D become small. On the contrary, when an intervention of the player occurs through operation of the ↓ button 38, as shown in FIG. 24B, the friend soldiers except for soldiers F16 and F60 who cannot concentrate due to that they are put in a battle state (the attack flag $F_L$ is attack or defense) concentrate about the leader $F_L$ to adjust the army formation. Therefore, the attack power A and the defense strength D of the soldier become large, and strong and weak points of the army formation can be recognized through white bright portion displayed on the TV monitor 4.

Next, in step 124 of FIG. 4B, a determination is made about whether or not the leader has died by determining whether or not the status flag $F_L$ of the leader is dead. When the determination is affirmative, the process advances to step 128, but when the determination is negative, a determination is made in the next step 126 about whether a line-up instruction for lining-up at a line-up position (refer to step 106) has issued. This instruction is issued by operation of the input device 3, and it is taken in the CPU block 20 by the main process in step 120. When a negative determination is made in step 126, the process advances to step 118. When an affirmative determination is made, a termination process is executed in step 128. In this termination process, when the affirmative determination is made in step 124, the image processing section 23 is caused to draw an image where the soldiers belonging to the army where the leader has died are routed. When the determination is affirmative in step 126, the image processing section 23 is caused to draw an image where alive soldiers are returned back to the line-up position which has been calculated in step 104 and the army formation is re-arranged, and the battle routine is terminated.

(Second Embodiment)

Next, a second embodiment where the present invention is applied to a home-use video game device will be explained. In this embodiment, instead of the army formation strength calculation sub-routine shown in the first embodiment, an army formation strength calculation sub-routine with a different processing logic is employed. It is to be noted that in this embodiment, like constituent elements and process routine are denoted by like reference numerals in the first embodiment and description thereof will be omitted.

Figure 25:
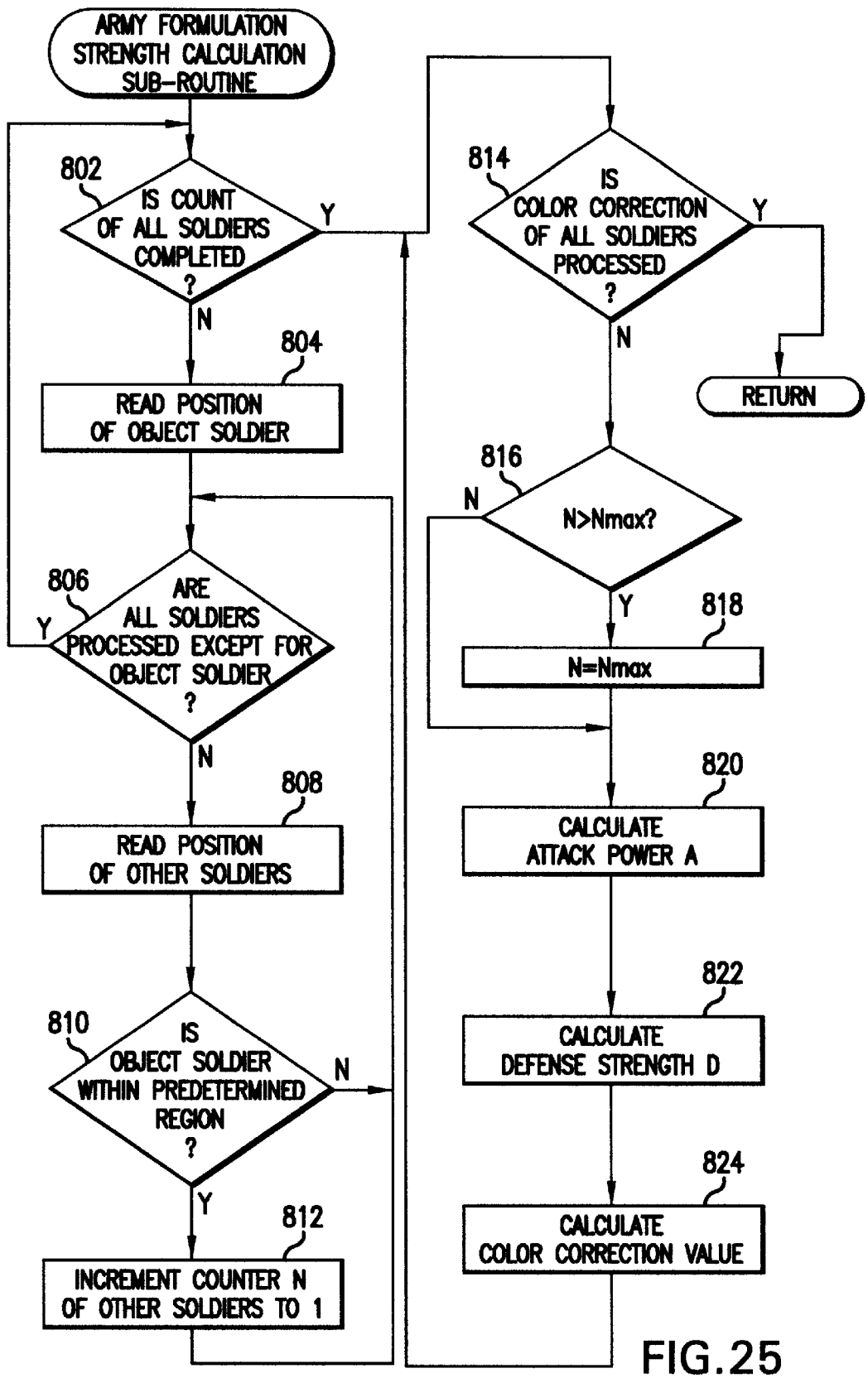
FIG. 25 is a flowchart showing an army formation strength calculating sub-routine of a second embodiment showing the details of step 222 of a formation setting process sub-routine, step 434 of a movement process sub-routine and step 524 of a battle process sub-routine.

As shown in FIG. 25, in an army formation strength calculation sub-routine of this embodiment, in step 802, a determination is made about whether or not a support soldier count process on all the support soldiers has been terminated. When the determination is negative in the step, the position of the object soldier is read out in step 804, and a determination is made in the next step 806 about whether or not the process on all the soldiers has been terminated. When a negative determination is made in step 806, the process advances to the next step 808, and when an affirmative determination is made, the process returns back to step 802. That is, in step 802 to step 806, as shown in FIG. 26, all the soldiers except for the object soldiers are processed in the small number order of the object soldiers (the same process is conducted in the army E).

In the next step 808, another soldier is read out and a determination is made in step 810 about whether the anther soldier is in the support region about the object soldier. When a negative determination is made in the step, the process returns back to step 806, and when an affirmative determination is made, the counter for the number N of support soldiers for another soldier is incremented by 1 in the next step 812 and the process returns back to step 806. That is, in step 806 to step 812, as shown in FIG. 27A, assuming that the object solder is denoted by F1, the position thereof has been obtained in the above-mentioned step 804, and the position of another soldier F2 is read out in step 808.

In step 810, as shown in Table 4, in case of the solder type "foot soldier", a determination is made about whether or not the another soldier F2 exists in the support region A1 which is the predetermined region of breadth of 4 m×length of 8 m in the 3-dimensional virtual space. Since the anther soldier F2 exists, as the object soldier F1 is a character which can support the another solder F2, the counter for the number N of support soldiers for the another soldier F2 is incremented by 1 and the process returns back to step 806. Next, in step 806, the same process is performed on the next another soldier F3, and the counter for the number N of support soldiers for the anther soldier F3 is incremented by 1. The same processing is performed until the number of processed soldiers reaches a predetermined number of other soldiers which has been preset in step 818, i.e., another soldier F100 is processed. Accordingly, in steps 802 to 812, as shown in FIG. 27B, since the other soldiers F2, F3 and F4 exist in the support region A1 about the object soldier F1, as these other soldiers can be supported by the object soldier, the counter for the number N of support soldiers is incremented 1 by 1, and since the another soldier F3 exists in the support region A2 about the object soldier F2, the counter for the number N of support soldiers for the another soldier F3 is incremented by 1 (accumulated). The processing about the same accumulation is performed up to the object soldier F100.

TABLE 4

| SOLDIER CORPS | SOLDIER KIND | SUPPORT AREA a × b (m²) | MAXIMUM VALUE OF NUMBER N OF SUPPORT SOLDIERS |
| --- | --- | --- | --- |
| FOOT SOLDIER TYPE | FOOT SOLDIER SPEARMAN | 4 m × 8 m | 15 |
| BOW SOLDIER TYPE | SHORT-RANGE BOW SOLDIER LARGE BOW SOLDIER | 10 m × 2 m | 15 |
| HORSE SOLDIER TYPE | LIGHT CAVALRYMAN LANCER HUNTING HORSE SOLDIER ELEPHANT SOLDIER | 8 m × 16 m | 7 |

Next, when an affirmative determination is made in step 802, a determination is made in step 814 about whether the calculation of the color correction value has been performed on all the soldier. When a negative determination is made in the step, processings similar to step 306 to step 314 in FIG. 6 are performed in step 814 to 824, and the process returns back to step 814. On the other hand, when the determination is affirmative in step 814, the army formation strength calculation sub-routine is terminated and the process advances to a step next to the original step.

As mentioned above, in the above embodiments, according to increase in the number of friend soldiers existing near the object soldier, namely, increase in a close degree of soldiers, the attack power and the defense strength of these soldiers are made large (accumulated) (refer to steps 304, 310 and 312 in FIG. 6, and steps 802 to 812, 820 and 822). Therefore, in the case of the foot soldiers, as the close degree becomes higher, the attack power and the defense strength are increased, and in the case of the bow soldiers, as development in a transverse direction is increased, the attack power is made large. Thus, the group battle tactics can be expressed realistically. Since the embodiments are structured such that a formation (army formation) can be selected from a plurality of ones, unevenness distribution of strong and weak points in the formation can be expressed on the basis of a difference in magnitude of attack power and defense strength of each soldier. Therefore, since the attack power or the like of each soldier is calculated for each predetermined time (1/60 seconds), which is different from the conventional battle games where the attack power and the defense strength of each soldier or each group is uniformly calculated, or the attack power and the defense strength of each soldier or each group are set on the basis of congeniality such as a mora, for example, such a definition that a fish scale formation is stronger than a crane wing formation (v-shaped military formation) and a bee arrow formation is stronger than the fish scale formation, an aspect where the attack power or the like varies momentarily according to the change of the state of the group can be expressed. Moreover, since the embodiments are structured such that the attack power A is drawn after the color correction processing is performed in the image processing section 23 by calculating and transferring the color correction value (steps 314, 224, 436, 526 and 824), a soldier with a large attack power A appears in a white bright manner, and the uneven distribution of attack power in the group can immediately be recognized. Accordingly, considering the formation of an enemy army, weapons of an enemy soldier, a distance from an enemy, the player can enjoy such a tactics as attack a weak point of an enemy group.

Incidentally, in the above embodiments, in order to define the vicinity of the object soldier, the support region defined by a horizontal length a (m) and a vertical length b (m) has been used. However, in this invention, it is not required that the support region is rectangular. For example, various support regions such as a circle, a sphere, a triangle, a polygon or the like can be used in this invention. Also, in the above embodiments, the number of support soldiers has been calculated assuming that the object soldier is positioned at a center of an upper end or a center of a lower end of a rectangle. However, the present invention is not limited to such a set position, but such a structure can be employed that the object soldier is positioned at a center of a support region or any position. Further, in the above embodiments, such a structure has been employed that a center of the virtual frame Wm is coincident with the position of the leader, but the center of the virtual frame Wm and the position of the leader may be calculated independently.

Also, in the above embodiments, the attack power and the defense strength have been calculated linearly according to the number N of support soldiers by the equations (1) and (2). However, such a configuration may be employed that the attack power and the defense strength are rapidly increased according to increase in the number N of support soldiers for example, a second-order function. Also, instead of color correction approaching to white linearly which is performed in the color correction process in the image processing section 23, such a configuration may be employed that approaching to white is performed in a manner of a second-order function according to the color correction process. Furthermore, in the above embodiments, such a configuration has been employed that both the attack power and the defense strength are increased according to increase in the number of support soldiers N. However, in this invention, such a configuration may be employed that the attack power and the defense strength are changed according to different logics from each other. As one example, the support coefficient KD in the equation (2) may be set to minus so as to make small the defense strength of a portion with a high attack power. Furthermore, in the above embodiments, such a configuration has been employed that the color correction value is made equal to the number N of support soldiers for simplification of calculation. In this invention, such a configuration may be employed that the attack power (or the defense strength) is once calculated according to the above equations (1) and (2), and the color correction value to the calculated attack power is calculated by referring to a table with color correction values corresponding to, for example, 16-divided attack powers. According to such a configuration, even when there is no linear relationship between the attack power or the like and the number N of support soldiers, that is, even when the relationship between the number N of support soldiers and the attack power or the like is not maintained in a linear relationship, appropriate color correction can be performed in a stepping manner.

Further, in the above embodiments, such an example has been shown that the color tone of the entire of soldiers is uniformly corrected. In this invention, such a configuration may be employed that an image of a soldier is divided into 15 pieces from a front of the soldier to a rear thereof and the image is brightened white from the front to the rear in a sequential manner, or a predetermined portion of a soldier or a weapon is brightened white at 16 levels. Also, in this embodiments, such a configuration has been employed that a soldier is brightened white at 16 levels according to the attack power. In the invention, it is unnecessary that the brightness is limited to the 16 levels and the color is limited to white. That is, the present invention can be configured such that the player can recognize a soldier with a high attack power and/or the strong and weak points of the attack power of the army formation when he/she watches the TV monitor 4. Accordingly, for example, such a configuration can be employed in this invention that a plurality of images different only in color tone are prepared according to levels of attack power of to the same soldier in advance and one of the prepared images is selected according to the color correction value.

Also, in the above embodiments, such an example has been disclosed that the calculations of attack power and color correction value for each soldier are performed for each vertical blanking interruption. Such calculations may be made for each five vertical blanking interruptions, for example, in view of loads on a sub-CPU (not shown) of the CPU block 20 or the image processing section 23. Further, the calculations of the attack power, the defense strength and the color correction value can be made according to different number of times of the vertical blanking interruption, respectively.

Moreover, in the above embodiments, such a configuration has been employed that the color correction processing is made by the sub-CPU of the image processing section 23, but the processing may be made by CPU of the CPU block 20. Also, in the above embodiments, such a configuration has been employed that by reading out the recording medium 1 with a game program recorded thereon by the medium reading section 22, the program is transferred to RAM. Such a configuration can be employed that, without providing the medium reading section 22, the game program is stored in ROM and the game program is read out from ROM. When such a configuration is employed, the present invention can be structured as an exclusive machine for game. Further, in the above embodiments, the example where a CD-ROM is used as the recording medium has been explained. Even when a ROM cartridge, a floppy disk with a mass volume, a magnet-optical disk or the like, which can be loaded in RAM of the CPU block 20 is used, the present invention is applicable to a device with a medium reading section for such a recording medium.

In the above embodiments, various set values and the calculation equations have been disclosed as one example, but the present invention is not limited to these values and equations. It is obvious to those skilled in the art that the present invention can be modified in various manners within the scope or spirit of the present invention herein claimed.

What is claimed is:

1. A character group battle method in which a plurality of characters that are displayed in a three-dimensional virtual space form groups of friends and enemies that battle against one another, comprising the steps of:

calculating the position of each of the characters in the three-dimensional virtual space;

calculating the character number of the other one or more friend characters existing in a predetermined region about the character; and calculating at least one of an attack or a defense value respectively expressing at least one of an attack power or a defense strength of the character on the basis of the character number.

2. The character group battle method according to claim 1, wherein a line-up position of the characters is calculated on the basis of an army formation of the group selected by one of a player and a computer.

3. The character group battle method according to claim 2, wherein an army formation of the group during group movement has a similar shape to the army formation of the group in the line-up position of the character.

4. The character group battle method according to claim 1, wherein the predetermined region is selected from a region group which is predetermined according to the personality of the character.

5. The character group battle method according to claim 1, wherein at least one of the attack value or the defense strength is limited to a maximum value which is predetermined when the character number exceeds the maximum value.

6. The character group battle method according to claim 1, further comprising the step of calculating a change value for changing expression of the character in the three-dimensional virtual space on the basis of at least one of the attack value or the defense value.

7. A character group battle method in which a plurality of characters that are displayed in a three-dimensional virtual space form groups of friends and enemies that battle against one another, comprising the steps of:

calculating the position of each character in the three-dimensional virtual space, when one or more other friend characters exist within a predetermined region about the character, accumulating, as the character capable of supporting one or more of the other friend characters, the character number of supportable characters which can support the other one or more friend characters for the character; and calculating at least one of an attack value or a defense value expressing at least one of an attack power or a defense strength of each character on the basis of the accumulated character number.

8. The character group battle method according to claim 7, wherein a line-up position of the characters is calculated on the basis of an army formation of the group selected by one of a player and a computer.

9. The character group battle method according to claim 8, wherein an army formation of the group during group movement has a similar shape to the army formation of the group in the line-up position of the characters.

10. The character group battle method according to claim 7, wherein the predetermined region is selected from a region group which is predetermined according to personalities of the characters.

11. The character group battle method according to claim 7, wherein at least one of the attack value or the defense strength is limited to the predetermined maximum value when the character number exceeds the maximum value.

12. The character group battle method according to claim 7, further comprising the step of calculating a change value for changing expression of the character in the three-dimensional virtual space on the basis of at least one of the attack value or defense value.

13. A computer-executable program stored on a computer-readable medium, said program comprising a process that comprises the character group battle method of claim 1.

14. A computer-readable recording medium on which there has been recorded a computer-executable program, said program comprising a process that comprises the character group battle method of claim 1.

15. A computer-executable program stored on a computer-readable medium, said program comprising a process that comprises the character group battle method of claim 7.

16. A computer-readable recording medium on which there has been recorded a computer-executable program, said program comprising a process that comprises the character group battle method of claim 7.

17. A game device which can record a character group battle program in a storing section, the character group battle program in which a plurality of characters that are displayed in a three-dimensional virtual space form groups of friends and enemies that battle against one another, comprising:
  a position calculator for calculating the position of each of the characters in the three-dimensional virtual space;
  a character number calculator for calculating the character number of one or more friend characters existing within a predetermined region about each of the characters; and
  an attack value and defense value calculator for calculating at least one of an attack value or a defense value respectively expressing at least one of an attack power or a defense strength of each of the characters on the basis of the character number calculated by the character number calculator.

18. The game device according to claim 17, further comprising a change value calculator for calculating a change value for changing expression of the characters in the three-dimensional virtual space on the basis of at least one of the attack value or the defense value expressing at least one of the attack power or the defense strength of the characters calculated by the attack value and defense value calculator.

19. A game device which can record a character group battle program in a storing section, the character group battle program being configured such that a plurality of characters that are displayed in a three-dimensional virtual space form groups of friends and enemies that battle against one another, comprising:
  a position calculator for calculating the position of each of the characters in the three-dimensional virtual space;
  an accumulator for, when one or more of other friend characters exist within a predetermined region about one character at the characters, accumulating, as the one character capable of supporting one or more at the other friend characters, the character number of supportable characters which can support the other friend characters for each of the characters; and
  an attack value and defense value calculator for calculating at least one of an attack value or a defense value expressing at least one of an attack power or a defense strength of the characters on the basis of the accumulated character number.

20. The game device according to claim 19, further comprising a change value calculator for calculating a change value for changing expression of the characters in the three-dimensional virtual space on the basis of at least one of the attack value or defense value expressing at least one of the attack power or the defense strength of the characters calculated by the attack value and defense value calculator.

* * * * *